(12) United States Patent
Lee et al.

(10) Patent No.: US 12,277,328 B2
(45) Date of Patent: Apr. 15, 2025

(54) ELECTRONIC DEVICE AND OPERATING METHOD THEREOF

(71) Applicant: SAMSUNG ELECTRONICS CO., LTD., Suwon-si (KR)

(72) Inventors: Seunghan Lee, Suwon-si (KR); Heeseok Eun, Suwon-si (KR); Kyungkeun Lee, Suwon-si (KR); Soo-Young Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 18/484,000

(22) Filed: Oct. 10, 2023

(65) Prior Publication Data
US 2024/0256159 A1 Aug. 1, 2024

(30) Foreign Application Priority Data
Jan. 6, 2023 (KR) .......................... 10-2023-0002194

(51) Int. Cl.
*G06F 3/06* (2006.01)
*G06F 11/30* (2006.01)

(52) U.S. Cl.
CPC .......... *G06F 3/0631* (2013.01); *G06F 3/0619* (2013.01); *G06F 3/0635* (2013.01); *G06F 3/0688* (2013.01); *G06F 11/3058* (2013.01)

(58) Field of Classification Search
CPC .... G06F 3/0631; G06F 3/0619; G06F 3/0635; G06F 3/0688; G06F 11/3058
USPC ........................................................ 711/154
See application file for complete search history.

(56) References Cited

U.S. PATENT DOCUMENTS

| | | | |
|---|---|---|---|
| 8,954,984 B2 | 2/2015 | Adinarayan et al. | |
| 9,152,472 B2 | 10/2015 | Kazama et al. | |
| 10,606,490 B2 | 3/2020 | Nimura et al. | |
| 10,942,503 B2 | 3/2021 | Dykes | |
| 11,157,328 B2 | 10/2021 | Matthes | |
| 11,210,001 B2 | 12/2021 | Yang et al. | |
| 11,256,314 B2 | 2/2022 | Bartlett et al. | |
| 11,580,233 B1* | 2/2023 | Wu | G06F 3/0604 |
| 2017/0262209 A1* | 9/2017 | Wang | G06F 3/0688 |
| 2018/0239696 A1* | 8/2018 | Lim | G06F 3/0625 |

(Continued)

FOREIGN PATENT DOCUMENTS

WO 22043812 A1 3/2022

*Primary Examiner* — Kenneth M Lo
*Assistant Examiner* — Han V Doan
(74) *Attorney, Agent, or Firm* — F. Chau & Associates, LLC

(57) ABSTRACT

An electronic device includes a host device and a plurality of storage devices. The host device includes a processor and a baseboard management controller (BMC). Each of the plurality of storage devices includes a storage controller and a micro controller unit (MCU). The processor and the storage controller support in-band communication, and the BMC and the MCU support out-of-band communication. The BMC receives monitoring data from the MCU of each of the plurality of storage devices based on the out-of-band communication. The processor allocates a first workload among one or more workloads to a first storage device among the plurality of storage devices, based on a monitoring data set including the monitoring data. The first storage device executes the first workload based on the in-band communication.

20 Claims, 19 Drawing Sheets

(56) References Cited

U.S. PATENT DOCUMENTS

| | | | |
|---|---|---|---|
| 2018/0260007 A1* | 9/2018 | Ping | H05K 7/20209 |
| 2019/0018600 A1 | 1/2019 | Tomaszewski et al. | |
| 2019/0171507 A1* | 6/2019 | Karpagavinayagam | G06F 11/0769 |
| 2020/0012452 A1 | 1/2020 | Bannur Subraya et al. | |
| 2021/0182166 A1 | 6/2021 | Hahn et al. | |
| 2021/0278891 A1* | 9/2021 | Basu | G06F 1/3225 |
| 2021/0286692 A1* | 9/2021 | Chien | G06F 11/2284 |
| 2021/0326177 A1 | 10/2021 | Vasudevan et al. | |
| 2021/0373951 A1 | 12/2021 | Malladi et al. | |
| 2021/0397517 A1 | 12/2021 | Sharma et al. | |
| 2022/0164139 A1* | 5/2022 | Moshe | G06F 3/0688 |
| 2023/0401321 A1* | 12/2023 | Moshe | G06F 21/577 |

\* cited by examiner

ELECTRONIC DEVICE AND OPERATING METHOD THEREOF

CROSS-REFERENCE TO RELATED APPLICATIONS

This application claims priority under 35 U.S.C. § 119 to Korean Patent Application No. 10-2023-0002194, filed on Jan. 6, 2023 in the Korean Intellectual Property Office, the disclosure of which is incorporated by reference herein in its entirety.

TECHNICAL FIELD

Embodiments of the present disclosure relate to a semiconductor device, and more particularly, to an electronic device and an operating method thereof.

Currently, an electronic device including a plurality of storage devices (e.g., a solid state drive (SSD)) is widely used in a server system. Such a storage device may provide excellent stability, excellent endurance, fast information access speed, and low-power consumption. When a large amount of data is processed, a method for efficiently allocating a workload to the plurality of storage devices included in the server system may be implemented.

SUMMARY

Embodiments of the present disclosure provide an electronic device capable of efficiently allocating a workload to storage devices.

Embodiments of the present disclosure provide an operating method of the electronic device.

According to an embodiment, an electronic device includes a host device and a plurality of storage devices. The host device includes a processor and a baseboard management controller (BMC). Each of the plurality of storage devices includes a storage controller and a micro controller unit (MCU). The processor and the storage controller support in-band communication, and the BMC and the MCU support out-of-band communication. The BMC receives monitoring data from the MCU of each of the plurality of storage devices based on the out-of-band communication. The processor allocates a first workload among one or more workloads to a first storage device among the plurality of storage devices, based on a monitoring data set including the monitoring data. The first storage device executes the first workload based on the in-band communication.

According to an embodiment, an electronic device includes a host device and a plurality of storage devices. The host device includes a processor, a baseboard management controller (BMC), and one or more workload queues. Each of the plurality of storage devices includes a storage controller and a micro controller unit (MCU). The BMC receives monitoring data from the MCU of each of the plurality of storage devices based on out-of-band communication between the BMC and the MCU. Based on a monitoring data set including the monitoring data, the processor inserts a first workload among one or more workloads to a first workload queue among the one or more workload queues, so as to be allocated to a first storage device among the plurality of storage devices. The first storage device executes the first workload based on in-band communication between the processor and the storage controller.

According to an embodiment, in an operation method of an electronic device, monitoring data are transmitted from an MCU of each of a plurality of storage devices to a BMC, based on out-of-band communication between the BMC and the MCU. By way of the processor, a first workload among one or more workloads is inserted into a first workload queue among the one or more workload queues based on a monitoring data set including the monitoring data, such that the first workload is allocated to a first storage device among the plurality of storage devices. By way of the first storage device, the first workload is executed based on in-band communication between the processor and the storage controller.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
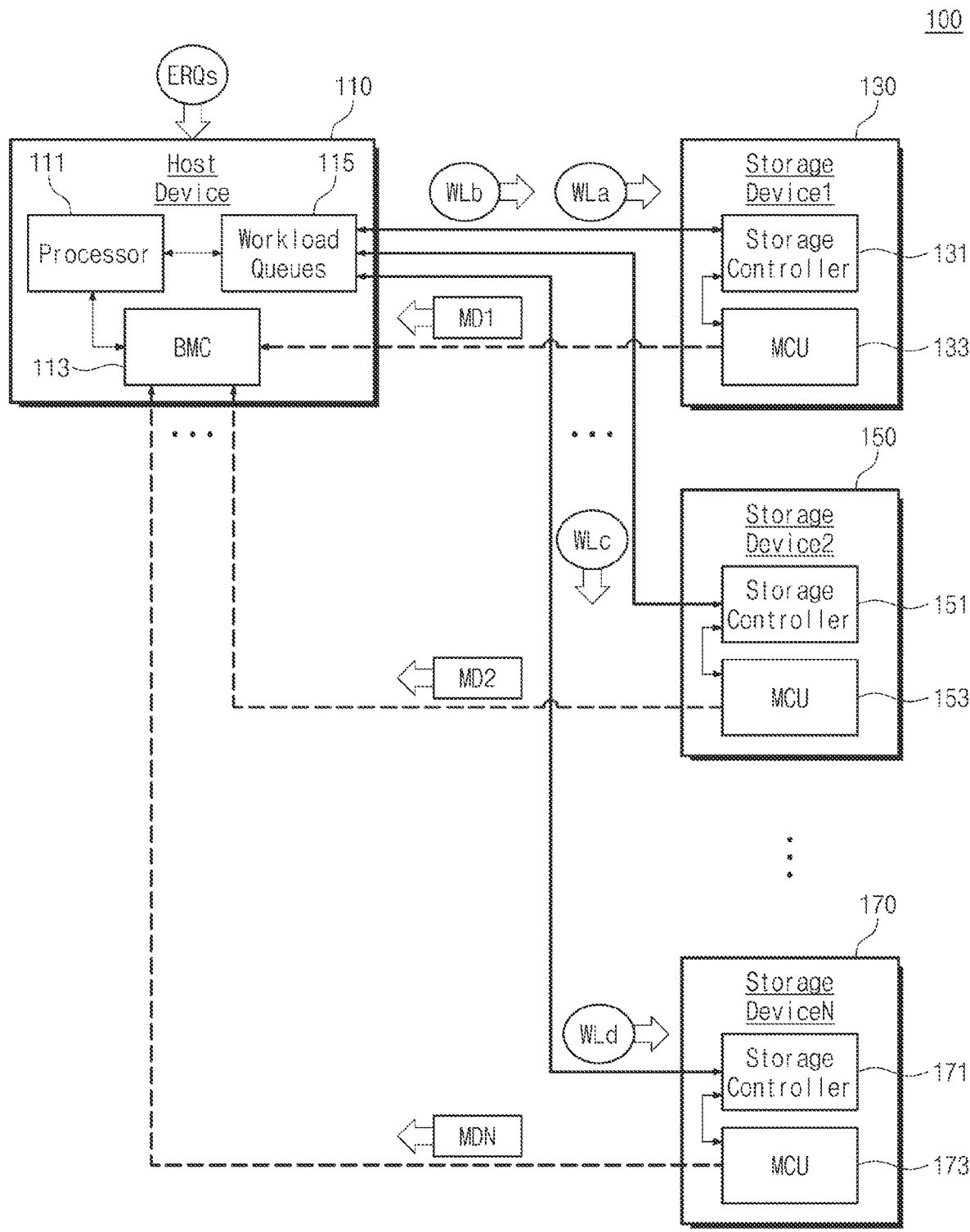
FIG. 1 is a diagram illustrating an electronic device according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a diagram illustrating an electronic device according to an embodiment of the present disclosure.

Referring to FIG. 1, an electronic device 100 may include a host device 110 and a plurality of storage devices 130, 150, and 170.

In an embodiment, the electronic device 100 may be a node or an entity that is located at an upper layer in a communication network having a hierarchical structure. The remaining nodes or entities located at a lower layer in the communication network may access the electronic device 100, and the electronic device 100 may be used to manage and store a large amount of data according to the access. For example, the electronic device 100 may be an arbitrary computing system such as a special-purpose computer, a general-purpose computer, a super computer, a mainframe computer, a data center, or workstation.

The host device 110 may include a processor 111, a baseboard management controller (BMC) 113, and workload queues 115. Each of the plurality of storage devices 130, 150, and 170 may include a storage controller and a micro controller unit (MCU). For example, the storage devices 130, 150, and 170 may respectively include storage controllers 131, 151, and 171 and may respectively include MCUs 133, 153, and 173.

The host device 110 and the plurality of storage devices 130, 150, and 170 may exchange data based on in-band communication and out-of-band communication capable of being executed completely independently of the in-band communication. For example, the processor 111 and the storage controllers 131, 151, and 171 may support the in-band communication, and the BMC 113 and the MCUs 133, 153, and 173 may support the out-of-band communication.

In an embodiment, based on the in-band communication, the processor 111 may transmit requests and addresses to the storage controllers 131, 151, and 171 and may individually transmit data associated with the requests and the addresses to the storage controllers 131, 151, and 171 or may individually receive the data associated with the requests and the addresses from the storage controllers 131, 151, and 171. The BMC 113 may individually receive monitoring data from the MCUs 133, 153, and 173 based on the out-of-band communication.

The storage devices 130, 150, and 170 may perform operations based on the requests and the addresses (or the requests, the addresses, and the pieces of data) that the processor 111 transmits based on the in-band communication. For example, the storage devices 130, 150, and 170 may perform the program operation, the read operation, or the erase operation, and may further perform the error correction code (ECC) encoding operation, the ECC decoding operation, the encryption operation, or the decryption operation. However, the present disclosure is not limited thereto.

The operations that the storage devices 130, 150, and 170 perform may be classified for each work unit. For example, the read operation may be performed together with the ECC decoding operation and the decryption operation, and the program operation may be performed together with the ECC encoding operation and the encryption operation. For example, the read operation, the ECC decoding operation, and the decryption operation may constitute one work, and the program operation, the ECC encoding operation, and the encryption operation may constitute another work. As the load on the system, the load that the electronic device 100 bears for each work (or a sum of loads that the components 110, 111, 113, 115, 130, 131, 133, 150, 151, 153, 170, 171, and 173 respectively bear) may be referred to as a "workload". The workload may include one or more addresses and one or more requests causing the load on the system, and may further include one or more data corresponding to the requests and the addresses.

The processor 111 may insert the workload to the workload queues 115 or may delete the workload from the workload queues 115, and the workload that is stored in the workload queues 115 may be transmitted to the storage devices 130, 150, and 170.

The monitoring data that each of the MCUs 133, 153, and 173 transmits based on the out-of-band communication may include hardware characteristics associated with the corresponding storage device and may further include a warning signal.

In an embodiment, the hardware characteristics may include, for example, an internal temperature, a program/erase (P/E) cycle, an un-correctable error correction code (UECC) count, and a correctable error correction code (CECC) count of the storage device, but the present disclosure is not limited thereto.

In an embodiment, the warning signal may be generated by each of the MCUs 133, 153, and 173 when one or more hardware characteristics among the hardware characteristics exceed a relevant performance limitation value or are close to the performance limitation value. When the internal temperature of the storage device increases to a given level or more due to the heat coming from the internal operations of the storage device, the storage device may provide a protection mode referred to as a "dynamic thermal throttling operation", which may protect elements of the storage device. Among the hardware characteristics, the performance limitation value (e.g., a performance limitation temperature) associated with the internal temperature may refer to a temperature at which the storage device enters the protection mode when the storage device provides the protection mode. The monitoring data will be described with reference to FIG. 4.

The processor 111 may allocate a first workload among one or more workloads to a first storage device among the plurality of storage devices 130, 150, and 170, based on a monitoring data set including the monitoring data. The monitoring data set may refer to data that are obtained by integrating some or all of the pieces of monitoring data transmitted from the MCUs 133, 153, and 173 of the plurality of storage devices 130, 150, and 170. The monitoring data set will be described with reference to FIGS. 5 and 6.

The first storage device may execute the first workload based on the in-band communication.

In an embodiment, the processor 111 may arbitrarily determine the first workload among the one or more workloads or may determine the first workload based on power consumption of each of the one or more workloads or based on characteristics of one or more workload queues in which the one or more workloads are stored.

In an embodiment, the processor 111 may determine the first storage device based on internal temperatures or the remaining lifetimes/reliabilities of the plurality of storage devices 130, 150, and 170. The processor 111 may identify the internal temperatures or the remaining lifetimes/reliabilities based on the monitoring data set.

In an embodiment, the processor 111 may classify the one or more workloads into one or more workload groups and may classify the plurality of storage devices 130, 150, and 170 into one or more storage groups. The processor 111 may determine the first workload based on the workload group or may determine the first storage device based on the storage group. The workload group and the storage group will be described with reference to FIGS. 8, 9, and 13.

In FIG. 1, the BMC 113 may receive the monitoring data from each of the MCUs 133, 153, and 173 respectively included in the plurality of storage devices 130, 150, and 170. For example, the BMC 113 may receive monitoring data MD1 associated with the storage device 130 from the MCU 133, may receive monitoring data MD2 associated with the storage device 150 from the MCU 153, and may receive monitoring data MDN associated with the storage device 170 from the MCU 173, where N is a positive integer greater than 2.

The host device 110 may receive execution requests ERQs associated with the one or more workloads from an external electronic device or may internally generate the one or more workloads, and the processor 111 may efficiently allocate the one or more workloads to the plurality of storage devices 130, 150, and 170. For example, the host device 110 may receive the execution requests ERQs from any other node or entities in the communication network and may internally generate one or more workloads in migration operations associated with preservation and management of data stored in the storage devices 130, 150, and 170. For example, the processor 111 may allocate workloads WLa and WLb to the storage device 130, may allocate a workload WLc to the storage device 150, and may allocate a workload WLd to the storage device 170, where d is a positive integer greater than 2.

With the configuration described above, an electronic device according to an embodiment of the present disclosure may efficiently allocate one or more workloads to each of a plurality of storage devices based on monitoring data received from each of a plurality of storage devices.

The electronic device may include workload queues, and may control the "allocation of workloads" by inserting or deleting one or more workloads from the workload queues. The electronic device may control the "allocation of workloads" by adding or deleting destination information indicating a specific storage device to each of the one or more workloads.

The "allocation of workloads" and the "reception of monitoring data" may be performed independently of each other, based on the in-band communication and the out-of-band communication.

The storage devices may provide the dynamic thermal throttling-based protection mode, which may protect the storage devices from a high internal temperature, and the electronic device may efficiently allocate one or more workloads to the storage devices such that entering the protection mode is blocked or delayed.

Figure 2:
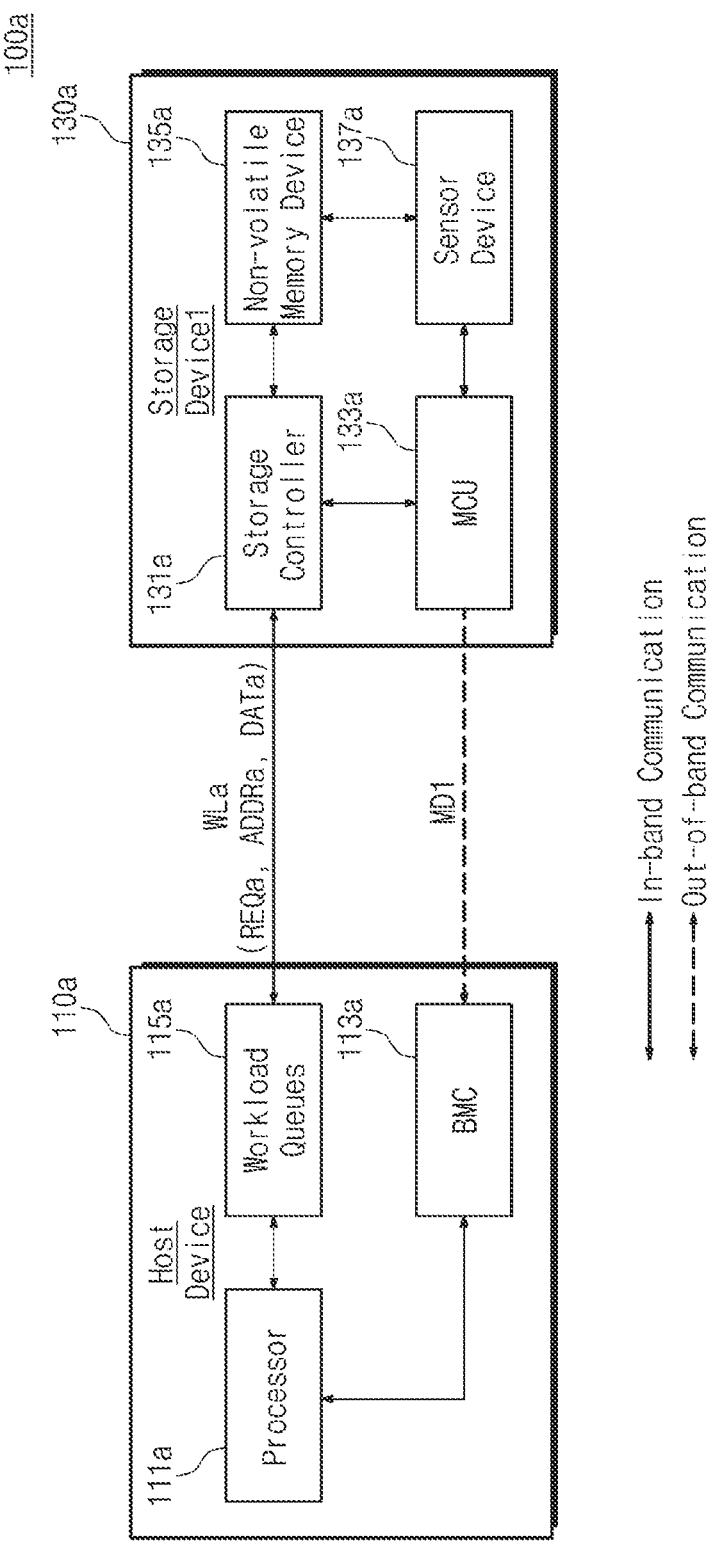
FIG. 2 is a diagram illustrating an embodiment of an electronic device including a host device and a storage device of FIG. 1.

FIG. 2 is a diagram illustrating an embodiment of an electronic device including a host device and a storage device of FIG. 1.

Referring to FIG. 2, a host device 110*a* may correspond to the host device 110 of FIG. 1, a storage device 130*a* may correspond to the storage device 130 of FIG. 1, and the remaining storage devices 150 and 170 of FIG. 1 may operate in the same manner as the storage device 130.

Referring to FIG. 2, an electronic device 100*a* may include the host device 110*a* and the storage device 130*a*. The host device 110*a* may include a processor 111*a*, a BMC 113*a*, and workload queues 115*a*, and the storage device 130*a* may include a storage controller 131*a*, an MCU 133*a*, a non-volatile memory device 135*a*, and a sensor device 137*a*.

The host device 110*a* and the storage device 130*a* may exchange data based on the in-band communication and the out-of-band communication capable of being executed completely independently of the in-band communication. For example, the processor 111*a* and the storage controller 131*a* may exchange data based on the in-band communication, and the BMC 113*a* and the MCU 133*a* may change data based on the out-of-band communication.

For example, the processor 111*a* may insert or delete the workload WLa including a request REQa and an address ADDRa (or the request REQa, the address ADDRa, and data DATa) into or from the workload queues 115*a* and may add destination information to the workload WLa. The processor 111*a* may transmit the workload WLa to the storage controller 131*a* based on the in-band communication, and the non-volatile memory device 135*a* may execute the workload WLa.

For example, the MCU 133*a* may transmit the monitoring data MD1 to the BMC 113*a* based on the out-of-band communication. The storage controller 131*a* and the sensor device 137*a* may provide the MCU 133*a* with hardware characteristics associated with the storage device 130*a*, and the MCU 133*a* may process the hardware characteristics into the monitoring data MD1 based on a preset protocol and may transmit the monitoring data MD1 to the BMC 113*a*.

For example, the sensor device 137*a* may sense hardware characteristics associated with the storage device 130*a*, such as an internal temperature, an internal voltage/current, a charge amount of an internal capacitor, power consumptions of internal components, and internal parameters. For example, the storage controller 131*a* may manage hardware characteristics such as a program/erase (P/E) cycle, a program count, a read count, an erase count, a threshold voltage distribution, aa UECC count, and a CECC count. For example, the protocol may include various protocols complying with an Open Computer Project (OCP) standard, a Platform Level Data Model (PLDM) standard, a Network Controller Sideband Interface (NC-SI) standard, a Redfish standard, a Non-Volatile Memory Express Management Interface (NVMe_MI) standard, and a Management Component Transport Protocol (MCTP) standard.

In an embodiment, the MCU 133a may transmit the monitoring data MD1 to the BMC 113a periodically or non-periodically.

In an embodiment, in the process of processing the hardware characteristics into the monitoring data MD1, the MCU 133a may include a warning signal in the monitoring data MD1 together with the hardware characteristics or may include only the warning signal in the monitoring data MD1. In this case, the MCU 133a may transmit the monitoring data MD1 to the BMC 113a non-periodically only when the monitoring data MD1 include the warning signal.

In an embodiment, the storage device 130a may be a solid state drive (SSD). In an embodiment, the storage device 130a may be Universal Flash Storage (UFS), a Multimedia Card (MMC), or an embedded MMC (eMMC). In an embodiment, the storage device 130a may be implemented with a Secure Digital (SD) card, a micro SD card, a memory stick, a chip card, a Universal Serial Bus (USB) card, a smart card, a Compact Flash (CF) card, or any other device similar thereto.

In an embodiment, the non-volatile memory device 135a may include a NAND flash memory. In an embodiment, the non-volatile memory device 135a may include an Electrically Erasable Programmable Read-Only Memory (EE-PROM), a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), a Ferroelectric Random Access Memory (FRAM), or any other memory similar thereto.

Figure 3:
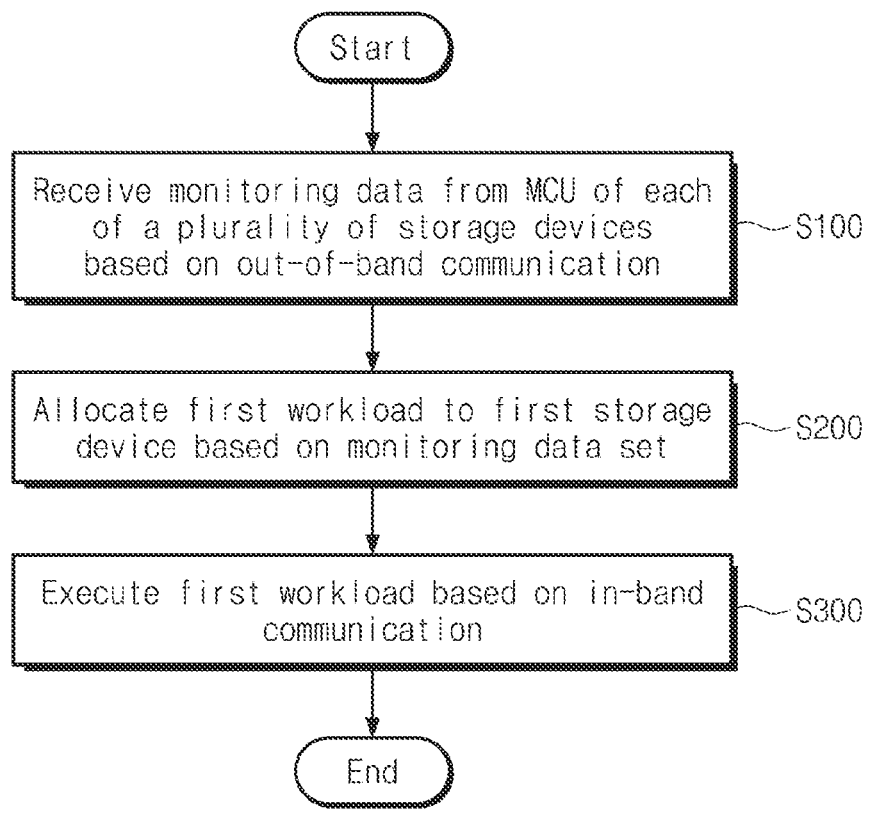
FIG. 3 is a flowchart illustrating an operating method of an electronic device according to an embodiment of the present disclosure.

FIG. 3 is a flowchart illustrating an operating method of an electronic device according to an embodiment of the present disclosure.

Referring to FIGS. 1 and 3, in the operating method of the electronic device 100 according to an embodiment of the present disclosure, the electronic device 100 may include the host device 110 and the plurality of storage devices 130, 150, and 170. The host device 110 may include the processor 111, the BMC 113, and the one or more workload queues 115. The plurality of storage devices 130, 150, and 170 may include the storage controllers 131, 151, and 171 and the MCUs 133, 153, and 173.

The BMC 113 may receive monitoring data from each of the MCUs 133, 153, and 173 of the plurality of storage devices, based on the out-of-band communication between the BMC 113 and the MCUs 133, 153, and 173 (S100).

The processor 111 may allocate a first workload among one or more workloads to a first storage device (e.g., one of 130, 150, and 170) among the plurality of storage devices 130, 150, and 170, based on a monitoring data set including a plurality of monitoring data (S200). The monitoring data set may refer to data that are obtained by integrating some or all of the pieces of monitoring data transmitted from the MCUs 133, 153, and 173.

In an embodiment, the processor 111 may determine the first workload and the first storage device in various manners. A manner of determining the first storage device will be described with reference to FIG. 10, and a manner of determining the first workload will be described with reference to FIG. 13.

The first workload may be executed by the first storage device based on the in-band communication between the processor 111 and a storage controller (e.g., a storage controller included in the first storage device).

Figure 4:
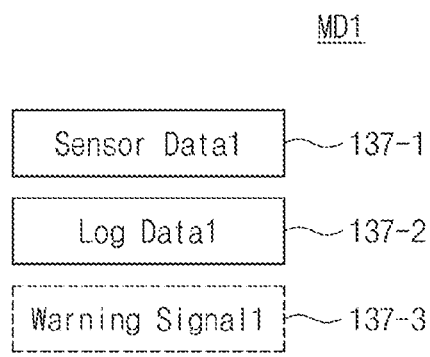
FIG. 4 is a diagram illustrating an embodiment of monitoring data of FIG. 3.

FIG. 4 is a diagram illustrating an embodiment of monitoring data of FIGS. 1 to 3.

Referring to FIGS. 2 and 4, the monitoring data MD1 may include sensor data 137-1, log data 137-2 and a warning signal 137-3.

The sensor data 137-1 may be generated by the sensor device 137a, the log data 137-2 may be generated by the storage controller 131a, and the warning signal 137-3 may be generated by the MCU 133a. As described with reference to FIG. 2, the sensor data 137-1 may include hardware characteristics of the storage device 130a, which are sensed by the sensor device 137a, such as, for example, an internal temperature, an internal voltage/current, a charge amount of an internal capacitor, power consumptions of internal components, and internal parameters, and the log data 137-2 may include hardware characteristics, which are stored by the storage controller 131a, such as, for example, a program/erase (P/E) cycle, a program count, a read count, an erase count, a threshold voltage distribution, a UECC count, and a CECC count. The warning signal 137-3 may be generated by the MCU 133a when one more of the hardware characteristics exceed a relevant performance limitation value or are close to the performance limitation value.

As described with reference to FIGS. 1 and 2, the monitoring data MD1 may be transmitted from the MCU 133a to the BMC 113a periodically or non-periodically.

In an embodiment, before the BMC 113a is first provided with the monitoring data MD1 from the MCU 133a, the BMC 113a may transmit a setting signal to the MCU 133a to set a transfer period of the monitoring data MD1 or data (or a signal) included in the monitoring data MD1. For example, the setting signal may include an opcode. When the opcode is set to a first code value, the MCU 133a may transmit the monitoring data MD1 every preset period. When the opcode is set to a second code value, the MCU 133a may include all of the sensor data 137-1, the log data 137-2, and the warning signal 137-3 in the monitoring data MD1. When the opcode is set to a third code value, the MCU 133a may include only some of the sensor data 137-1, the log data 137-2, and the warning signal 137-3 in the monitoring data MD1. However, the present disclosure is not limited thereto.

In an embodiment, based on the initialization process loaded when an electronic device is booted up, some or all of the sensor data 137-1, the log data 137-2, and the warning signal 137-3 may be transmitted from the MCU 133a to the BMC 113a.

Figure 5:
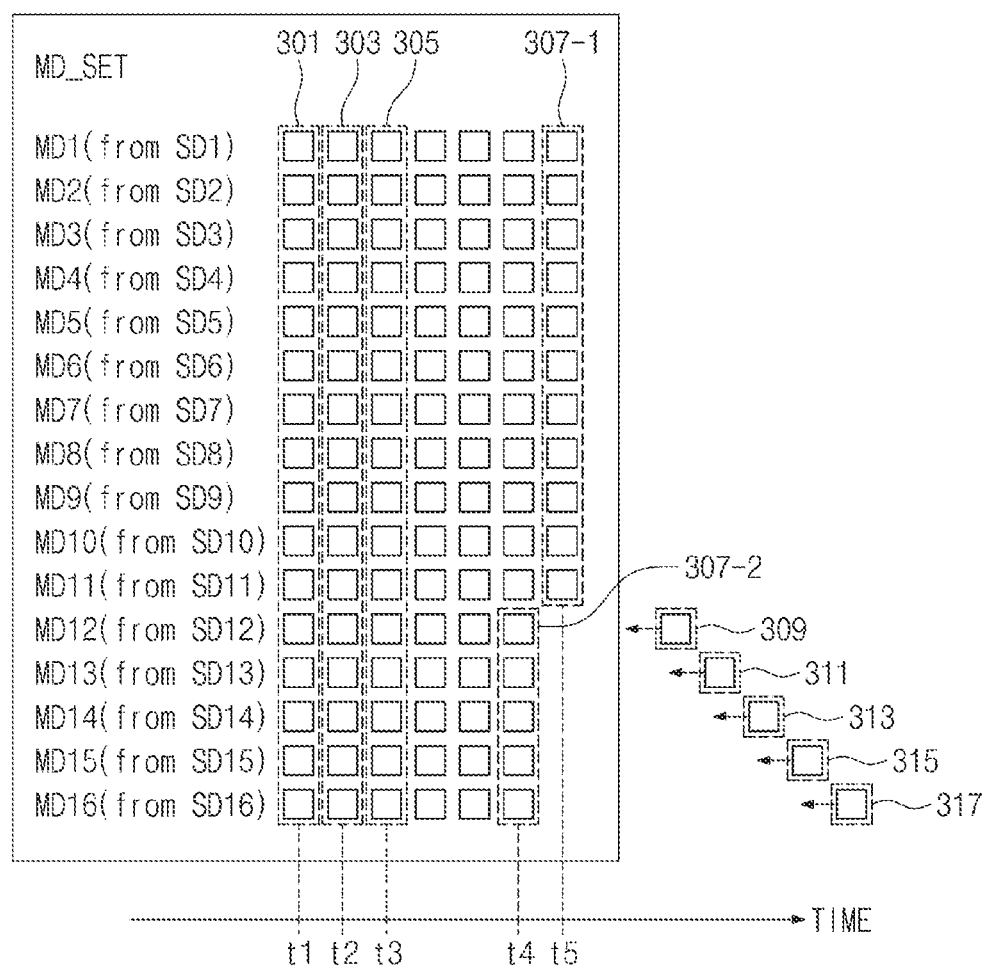
FIGS. 5 and 6 are diagrams for describing the process of generating a monitoring data set of FIGS. 1 to 3.
Figure 6:
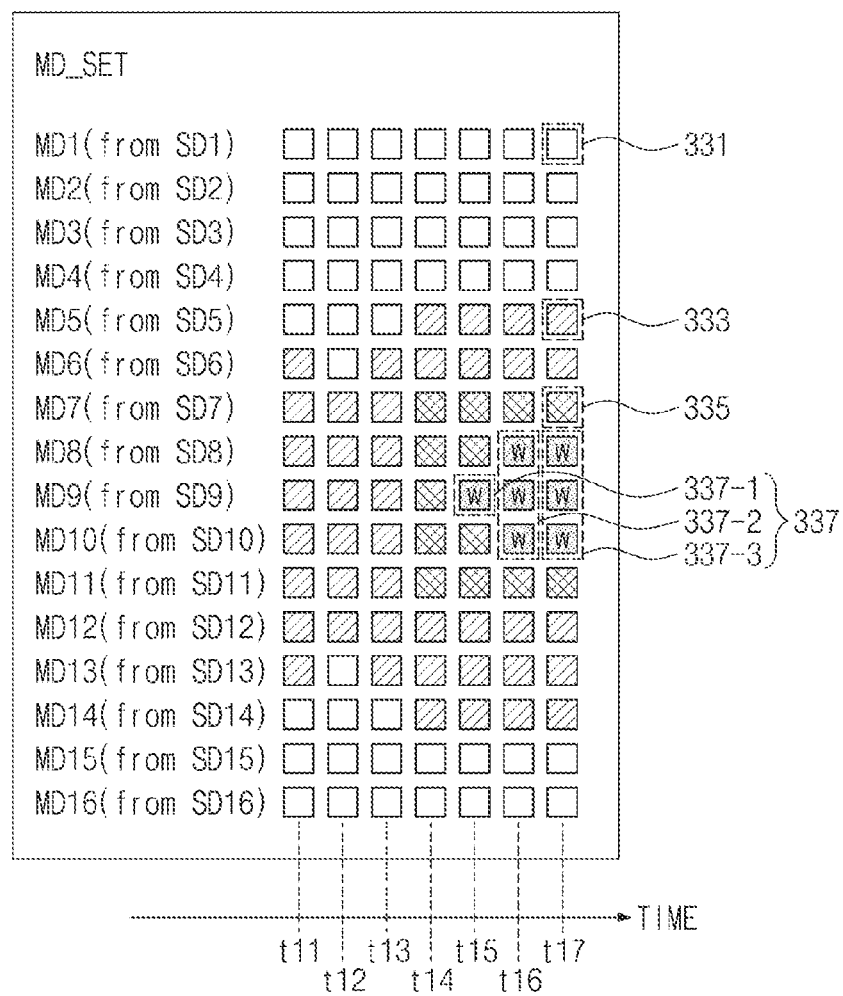

FIGS. 5 and 6 are diagrams for describing the process of generating a monitoring data set of FIGS. 1 to 3.

Referring to FIG. 5, a monitoring data set MD_SET may be generated by integrating, at a BMC of a host device, some or all of monitoring data MD1, MD2, MD3, MD4, MD5, MD6, MD7, MD8, MD9, MD10, MD11, MD12, MD13, MD14, MD15, and MD16. The monitoring data MD1 to MD16 may be respectively transmitted from MCUs of storage devices SD1, SD2, SD3, SD4, SD5, SD6, SD7, SD8, SD9, SD10, SD11, SD12, SD13, SD14, SD15, and SD16. For example, the monitoring data MD1 may be transmitted from the storage device SD1, the monitoring data MD2 may be transmitted from the storage device SD2, and the monitoring data MD3 to MD16 may be transmitted from the storage devices SD3 to SD16.

As points in time t1, t2, t3, t4, and t5 pass, the BMC may generate a monitoring data set by integrating all of the monitoring data that are completely transmitted to the BMC at a specific point in time, and a processor of the host device may allocate a specific workload to a specific storage device based on the monitoring data set. For example, at t1, the BMC may integrate pieces of monitoring data 301 to generate the monitoring data set. At t2, the BMC may integrate pieces of monitoring data 303 to generate the monitoring data set. At t3, the BMC may generate the monitoring data set based on pieces of monitoring data 305. For example, at t5, the BMC may exclude pieces of monitoring data 309, 311, 313, 315, and 317 that are not completely transmitted to the BMC and may generate the monitoring data set by integrating pieces of monitoring data 307-1 completely transmitted to the BMC and pieces of monitoring data 307-2 completed transmitted to the BMC. However, the present disclosure is not limited thereto.

Referring to FIG. 6, each of the monitoring data MD1 to MD16 may indicate an internal temperature of a relevant storage device. For example, the monitoring data 331, 333, 335, and 337 may indicate that the internal temperatures are a first temperature, a second temperature, a third temperature, and a fourth temperature, respectively, and the remaining monitoring data may be expressed in the same manner as the monitoring data 331, 333, 335, and 337. The second temperature may be higher than the first temperature, the third temperature may be higher than the second temperature, and the fourth temperature may be higher than the third temperature. The fourth temperature may exceed a performance limitation value (or a performance limitation temperature) or may be close to the performance limitation value, and monitoring data corresponding to the fourth temperature may include the warning signal described with reference to FIGS. 1 and 2.

Referring to FIG. 6, as points in time t11, t12, t13, t14, t15, t16, and t17 pass, the BMC may generate the monitoring data set by integrating all of the pieces of monitoring data completely transmitted to the BMC at a specific point in time. For example, at each of the points in time t11 to t17, the BMC may generate the monitoring data set to be similar in manner to that at each of the points in time t1, t2, and t3 of FIG. 5.

In an embodiment, the BMC may generate the monitoring data set by integrating only some of pieces of monitoring data completely transmitted to the BMC. For example, at each of the points in time t15, t16, and 17, the BMC may select the remaining monitoring data other than monitoring data including the warning signal and may generate the monitoring data set. At t15, the BMC may generate the monitoring data set by using only the remaining monitoring data other than monitoring data 337-1. At t16, the BMC may select only the remaining monitoring data other than pieces of monitoring data 337-2 and may generate the monitoring data set. At t17, the BMC may select only the remaining monitoring data other than pieces of monitoring data 337-3 and may generate the monitoring data set. However, the present disclosure is not limited thereto.

Figure 7:
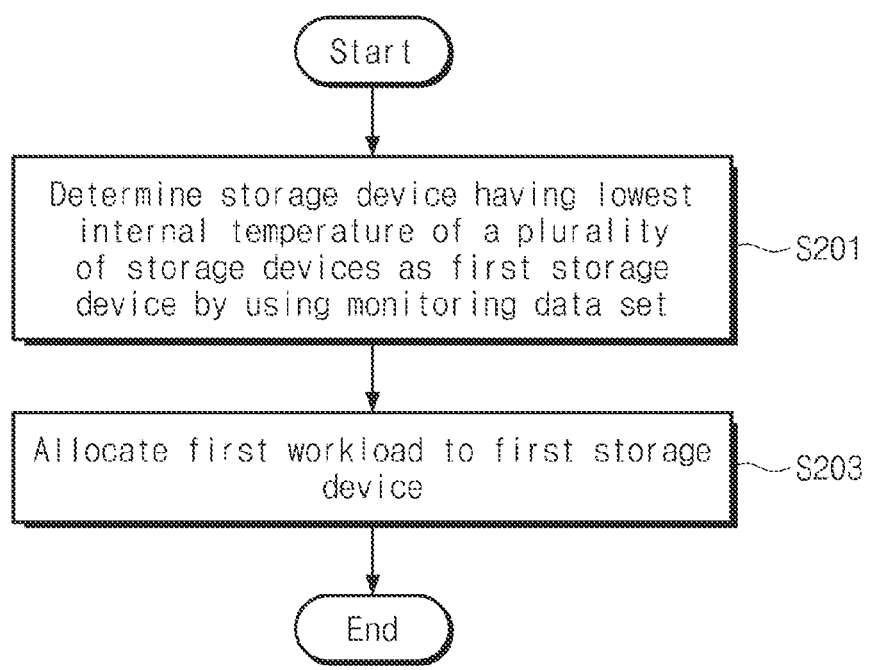
FIG. 7 is a flowchart illustrating an embodiment in which a first workload of FIG. 3 is allocated to a first storage device.

FIG. 7 is a flowchart illustrating an embodiment in which a first workload of FIG. 3 is allocated to a first storage device.

Referring to FIGS. 3 and 7, a processor of a host device may determine a storage device having the lowest internal temperature from among a plurality of storage devices as a first storage device by using a monitoring data set (S201).

In an embodiment, the monitoring data set may include monitoring data transmitted from an MCU of each of the plurality of storage devices, and the monitoring data transmitted from the MCU of each of the plurality of storage devices may indicate an internal temperature of the corresponding storage device. The processor may identify the internal temperature of each of the plurality of storage devices based on the monitoring data set and may identify the storage device having the lowest internal temperature from among the plurality of storage devices.

The processor may allocate a first workload of one or more workloads to the first storage device (S203).

In an embodiment, the first workload may be arbitrarily selected from the one or more workloads.

In an embodiment, when the internal temperature exceeds a performance limitation temperature or is close to the performance limitation temperature, the MCU may transmit the monitoring data further including the warning signal to a BMC of the host device. In this case, in an embodiment, the processor does not allocate the first workload to a storage device corresponding to the warning signal from among the plurality of storage devices by using the monitoring data set.

Figure 8:
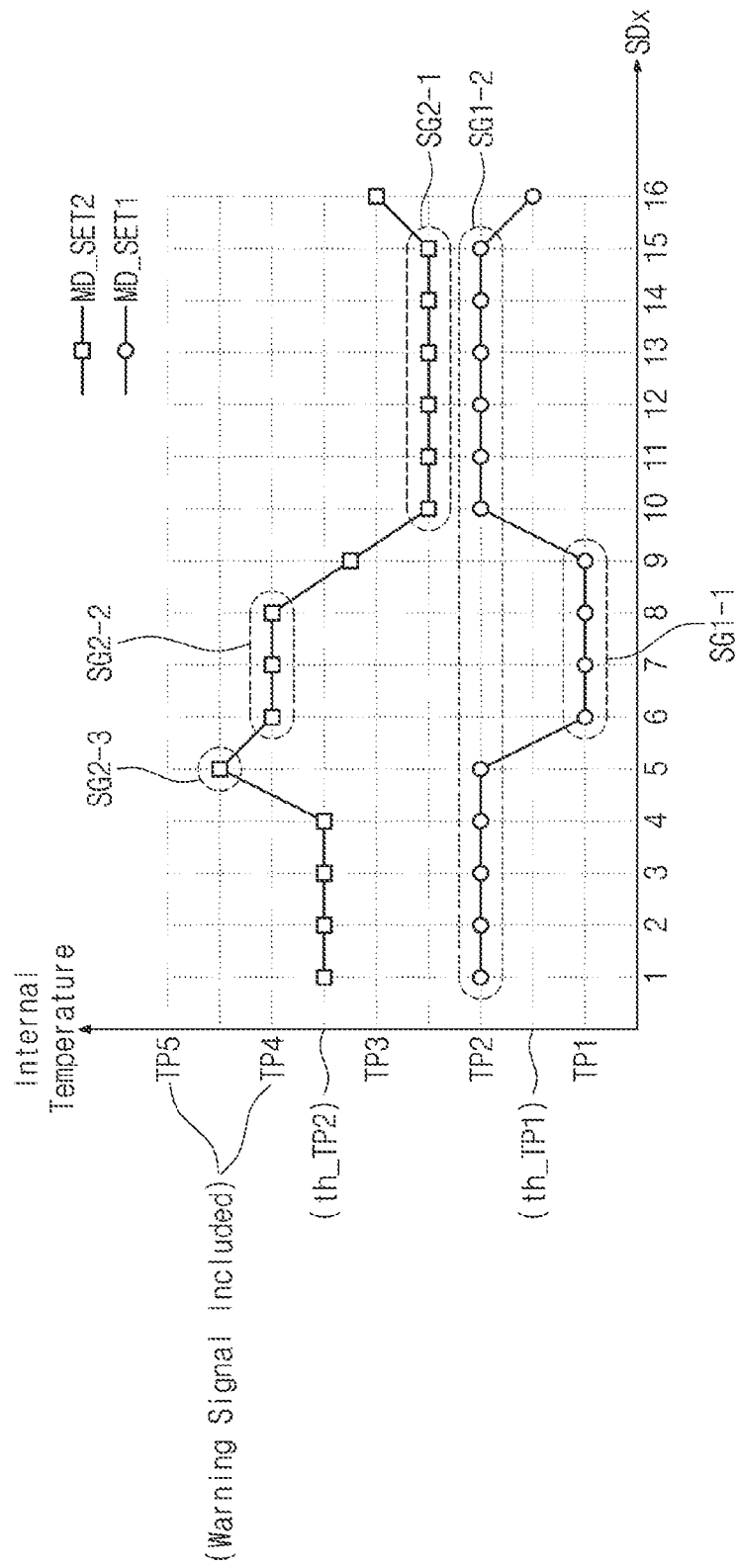
FIGS. 8 and 9 are diagrams for describing the process of classifying storage devices of FIG. 1 into storage groups.
Figure 9:
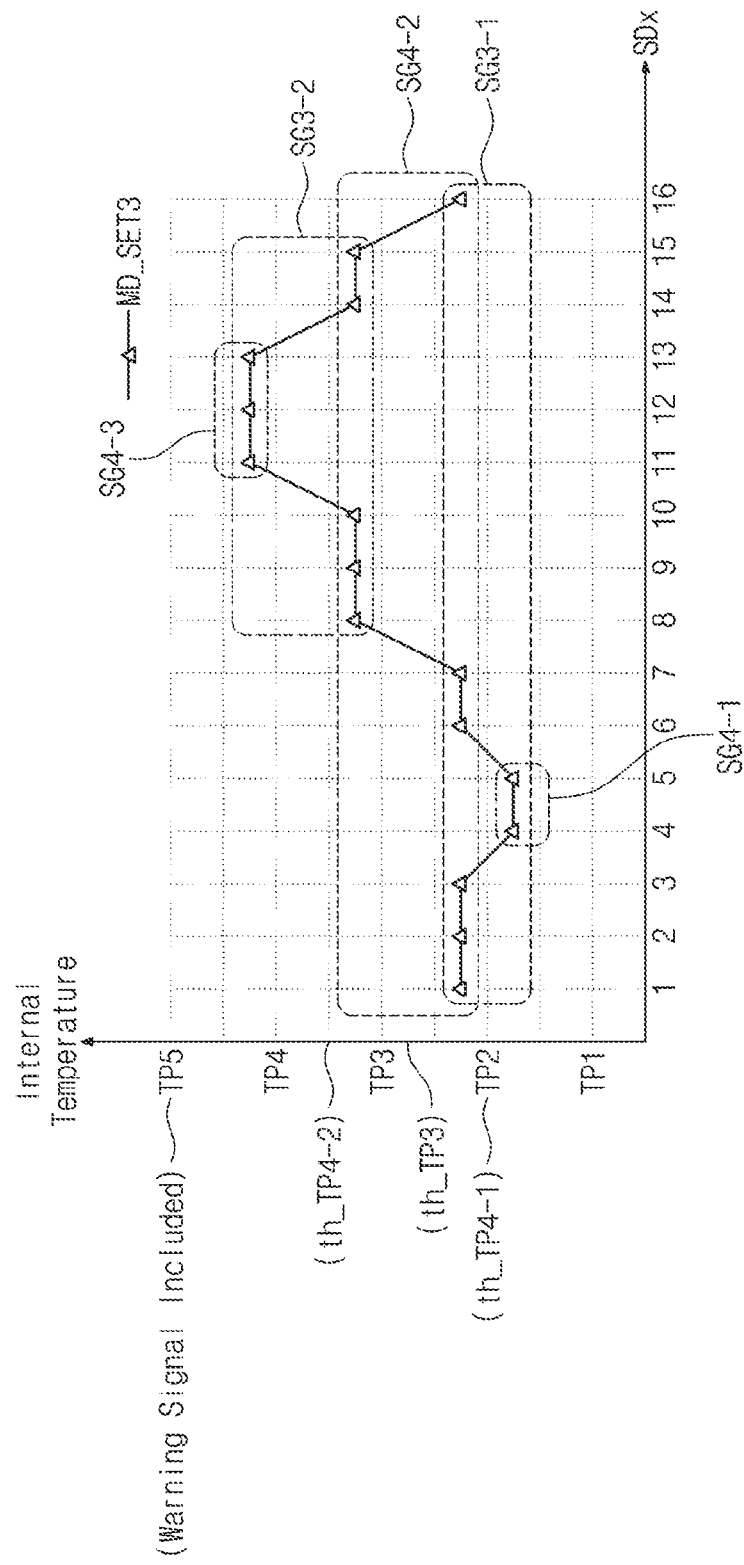

FIGS. 8 and 9 are diagrams for describing the process of classifying storage devices of FIG. 1 into storage groups.

As described with reference to FIG. 1, a processor of a host device may classify a plurality of storage devices into one or more storage groups and may allocate a first workload among one or more workloads to a first storage device among the plurality of storage devices based on the storage groups. In an embodiment, the processor may classify the plurality of storage devices into the storage groups based on a monitoring data set, or the processor may classify the plurality of storage devices into the storage groups based on one or more threshold values (e.g., threshold temperatures) regardless of the monitoring data set.

In FIGS. 8 and 9, monitoring data sets MD_SET1, MD_SET2, and MD_SET3 including pieces of monitoring data are illustrated. In FIGS. 8 and 9, the y-axis represents an internal temperature and the x-axis represents storage devices SD1, SD2, SD3, SD4, SD5, SD6, SD7, SD8, SD9, SD10, SD11, SD12, SD13, SD14, SD15, and SD16 (e.g., SDx corresponds to these storage devices).

Each of the monitoring data sets MD_SET1, MD_SET2, and MD_SET3 may include all of pieces of monitoring data transmitted from the storage devices SD1, SD2, SD3, SD4, SD5, SD6, SD7, SD8, SD9, SD10, SD11, SD12, SD13, SD14, SD15, and SD16 and may indicate internal temperatures of the storage devices SD1 to SD16.

In an embodiment, the monitoring data sets MD_SET1, MD_SET2, and MD_SET3 may be respectively generated at different points in time by a BMC of a host device.

Referring to FIG. 8, the processor of the host device may dynamically set a threshold temperature based on the monitoring data set MD_SET1 and may classify the storage devices SD1 to SD16 into storage groups SG1-1 and SG1-2 based on the threshold temperature. In an embodiment, the processor may set, at the threshold temperature, a temperature (e.g., th_TP1) between the highest temperature (e.g., TP2) and the lowest temperature (e.g., TP1) among internal temperatures of the storage devices SD1 to SD16, based on the monitoring data set MD_SET1. The processor may classify storage devices (e.g., SD6 to SD9) having a lower internal temperature than the threshold temperature as the storage group SG1-1 and may classify storage devices (e.g., SD1 to SD5 and SD10 to SD15) having a higher internal temperature than the threshold temperature as the storage group SG1-2. The processor may exclude a storage device (e.g., SD16) having an internal temperature that belongs to a given range based on the threshold temperature.

The processor may dynamically set a threshold temperature based on the monitoring data set MD_SET2 and may classify the storage devices SD1 to SD16 into storage groups SG2-1, SG2-2, and SG2-3 based on the threshold temperature. In an embodiment, the processor may set, as the threshold temperature, a temperature (e.g., th_TP2) between the highest temperature (e.g., between TP5 and TP4) and the lowest temperature (e.g., between TP3 and TP2) among internal temperatures of the storage devices SD1 to SD16, based on the monitoring data set MD_SET2. The processor may classify storage devices (e.g., SD10 to SD16) having a lower internal temperature than the threshold temperature as the storage group SG2-1, may classify some (e.g., SD6 to SD8) of storage devices having a higher internal temperature than the threshold temperature as the storage group SG2-2, and may classify a storage device (e.g., SD5) having the highest internal temperature as the separate storage group SG2-3. The processor may exclude storage devices (e.g., SD1 to SD4, SD9, and SD16) having an internal temperature that belongs to a given range based on the threshold temperature.

Referring to FIG. 9, the processor of the host device may in advance, set one or more threshold temperatures th_TP3, th_TP4-1, and th_TP4-2 regardless of the monitoring data set MD_SET3 and may classify the storage devices SD1 to SD16 into storage groups SG3-1 and SG3-2 or storage groups SG4-1, SG4-2, and SG4-3.

In an embodiment, the processor may in advance, set a threshold temperature (e.g., th_TP3) based on a value obtained by dividing TP5 being a temperature causing a warning signal by an arbitrary integer (e.g., "2"). The processor may classify storage devices (e.g., SD1 to SD7 and SD16) having a lower internal temperature than the threshold temperature as the storage group SG3-1 and may classify storage devices (e.g., SD8 to SD15) having a higher internal temperature than the threshold temperature as the storage group SG3-2.

In an embodiment, the processor may in advance, set one or more threshold temperatures (e.g., th_TP4-1 and th_TP4-2) based on a value obtained by dividing TP5 being a temperature causing the warning signal by another arbitrary integer (e.g., "3"). The processor may classify storage devices (e.g., SD4 and SD5) having a lower internal temperature than a first threshold temperature (e.g., th_TP4-1) as the storage group SG4-1, may classify storage devices (e.g., SD1 to SD3, SD6 to SD10, and SD14 to SD16) having an internal temperature higher than the first threshold temperature and lower than a second threshold temperature (e.g., th_TP4-2) as the storage group SG4-2, and may classify storage devices (e.g., SD11 to SD13) having a higher internal temperature than the second threshold temperature as the storage group SG4-3.

Figure 10:
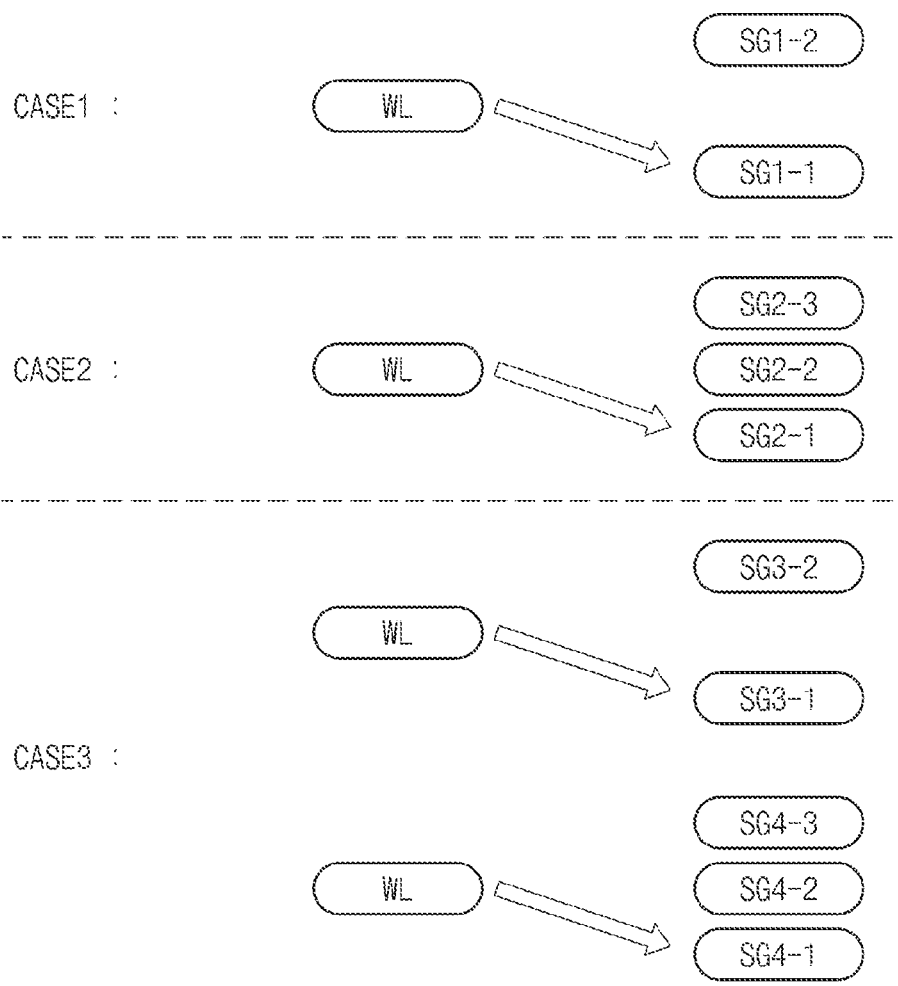
FIG. 10 is a diagram for describing the process of determining a first storage device based on a storage group of FIGS. 8 and 9.

FIG. 10 is a diagram for describing the process of determining a first storage device based on a storage group of FIGS. 8 and 9.

Referring to FIG. 10, a first storage device for allocating an arbitrary workload WL may be determined based on the storage groups SG1-1, SG1-2, SG2-1, SG2-2, SG2-3, SG3-1, SG3-2, SG4-1, SG4-2, and SG4-3 of FIGS. 8 and 9.

In CASE1, the storage group SG1-1 including storage devices having a relatively low internal temperature from among the storage groups SG1-1 and SG1-2 may be selected. In an embodiment, an arbitrary storage device among storage devices included in the storage group SG1-1 may be determined as the first storage device. In an embodiment, another storage device selected by using any other hardware characteristics together with the internal temperature from among the storage devices included in the storage group SG1-1 may be determined as the first storage device. For example, the internal voltage/current, the charge amount of the internal capacitor, the program/erase (P/E) cycle, etc. described with reference to FIG. 4 may be used to determine the first storage device together with the internal temperature.

Similar to CASE1, in CASE2 and CASE3, the storage group SG2-1 may be selected from the storage groups SG2-1, SG2-2, and SG2-3, the storage group SG3-1 may be selected from the storage groups SG3-1 and SG3-2, and the storage group SG4-1 may be selected from the storage groups SG4-1, SG4-2, and SG4-3.

In CASE2, an arbitrary storage device among storage devices included in the storage group SG2-1 may be determined as the first storage device, or another storage device selected by using any other hardware characteristics together with the internal temperature from among the storage devices included in the storage group SG2-1 may be determined as the first storage device.

In CASE3, an arbitrary storage device among storage devices included in the storage group SG3-1 may be determined as the first storage device, or another storage device selected by using any other hardware characteristics together with the internal temperature from among the storage devices included in the storage group SG3-1 may be determined as the first storage device.

In CASE3, an arbitrary storage device among storage devices included in the storage group SG4-1 may be determined as the first storage device, or another storage device selected by using any other hardware characteristics together with the internal temperature from among the storage devices included in the storage group SG4-1 may be determined as the first storage device.

Figure 11:
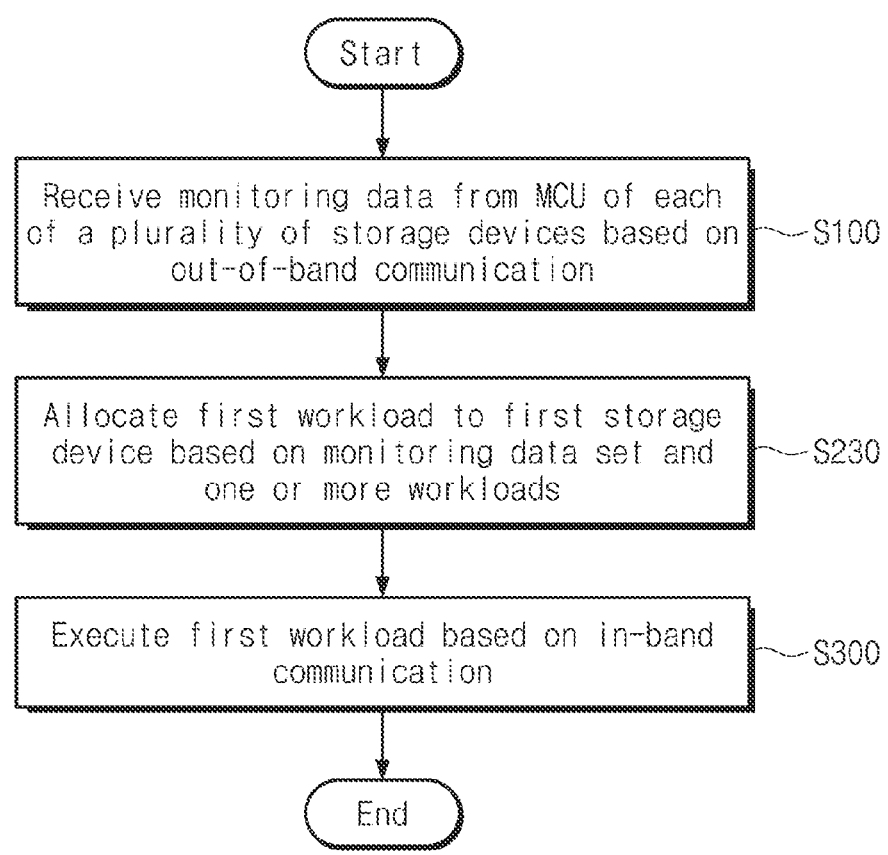
FIG. 11 is a flowchart illustrating an operating method of an electronic device according to an embodiment of the present disclosure.

FIG. 11 is a flowchart illustrating an operating method of an electronic device according to an embodiment of the present disclosure.

Compared to operation S200 of FIG. 3, referring to FIG. 11, in an operating method of an electronic device of FIG. 11, a processor of a host device may allocate a first workload to a first storage device based on a monitoring data set and one or more workloads, not only the monitoring data set.

Referring to FIGS. 1 and 11, in the operating method of the electronic device 100 according to an embodiment of the present disclosure, the electronic device 100 may include the host device 110 and the plurality of storage devices 130, 150, and 170. The host device 110 may include the processor 111, the BMC 113, and the one or more workload queues 115. The plurality of storage devices 130, 150, and 170 may include the storage controllers 131, 151, and 171 and the MCUs 133, 153, and 173.

The MCU (each of 133, 153, and 173) of the plurality of storage devices 130, 150, and 170 may transmit monitoring data to the BMC 113, based on the out-of-band communication between the BMC 113 and the MCUs 133, 153, and 173 (S100).

The processor 111 may allocate a first workload among the one or more workloads to a first storage device (e.g., one of 130, 150, and 170) among the plurality of storage devices 130, 150, and 170, based on a monitoring data set including a plurality of monitoring data and one or more workloads (S230). The monitoring data set may refer to data that are obtained by integrating some or all of the pieces of monitoring data transmitted from the MCUs 133, 153, and 173.

The first storage device may execute the first workload, based on the in-band communication between the processor 111 and a storage controller (e.g., a storage controller included in the first storage device) (S300).

Figure 12:
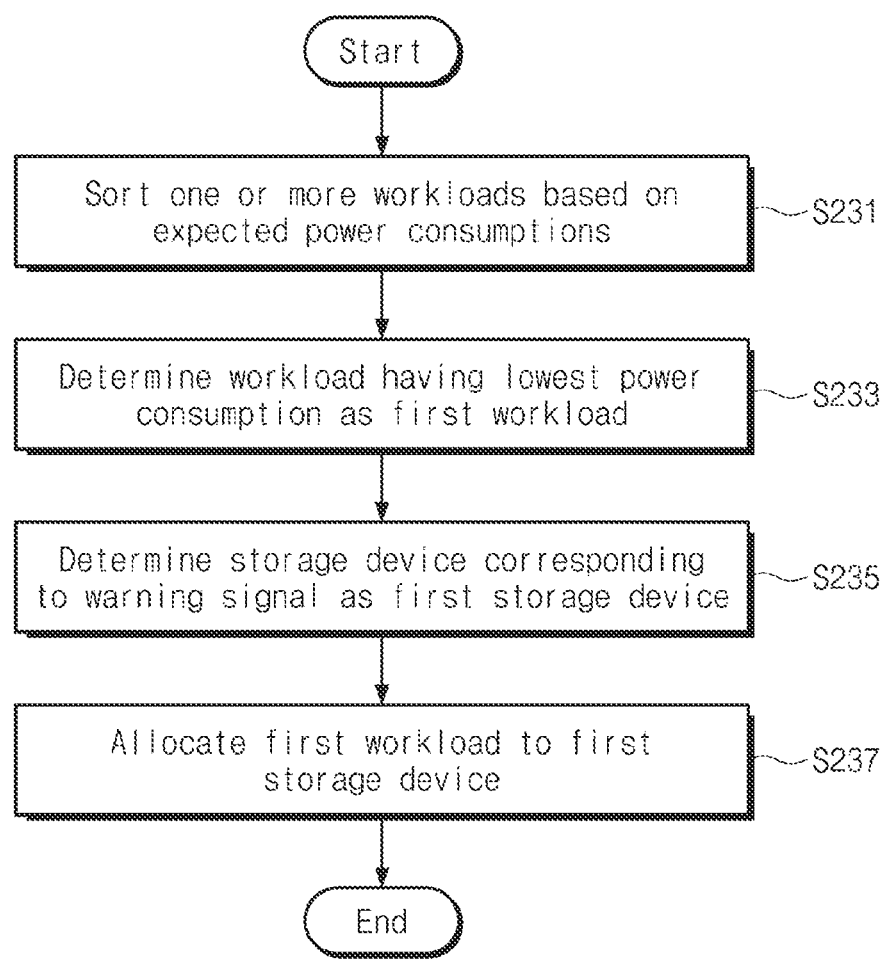
FIG. 12 is a flowchart illustrating an embodiment of an operation of FIG. 11, in which a first workload is allocated to a first storage device.

FIG. 12 is a flowchart illustrating an embodiment of an operation of FIG. 11, in which a first workload is allocated to a first storage device.

Referring to FIGS. 1, 11, and 12, in the operation of FIG. 11 where the first workload among the one or more workloads is allocated to the first storage device among the plurality of storage devices, the processor 111 may sort the one or more workloads based on an expected power consumption of each of the one or more workloads (S231).

In an embodiment, the expected power consumption may be estimated based on requests and addresses (or requests, addresses, and pieces of data) included in each of the one or more workloads or based on past histories of external electronic devices transmitting execution requests associated with the one or more workloads to a host device. The process of estimating the expected power consumption will be described with reference to FIG. 13.

The processor 111 may determine a workload having the lowest power consumption from among the one or more workloads as the first workload, based on a result of the sorting (S233).

The processor 111 may determine a storage device corresponding to a warning signal from among the plurality of storage devices as the first storage device by using the monitoring data set (S235).

The processor 111 may allocate the first workload to the first storage device (S237).

In an embodiment, the processor 111 may further determine a second workload among the one or more workloads, may further determine a second storage device among the plurality of storage devices, and may allocate the second workload to the second storage device. For example, based on the result of the sorting in operation S231, the processor 111 may determine a workload having the lowest power consumption from among the one or more workloads as the first workload and may determine a workload having the highest power consumption from among the one or more workloads as the second workload. For example, the processor 111 may classify the one or more workloads into one or more workload groups based on the result of the sorting. Based on the workload groups, the processor 111 may determine a workload having the lowest power consumption as the first workload and may determine a workload having the highest power consumption as the second workload. The process of determining the first workload and the second workload will be described with reference to FIG. 13.

Figure 13:
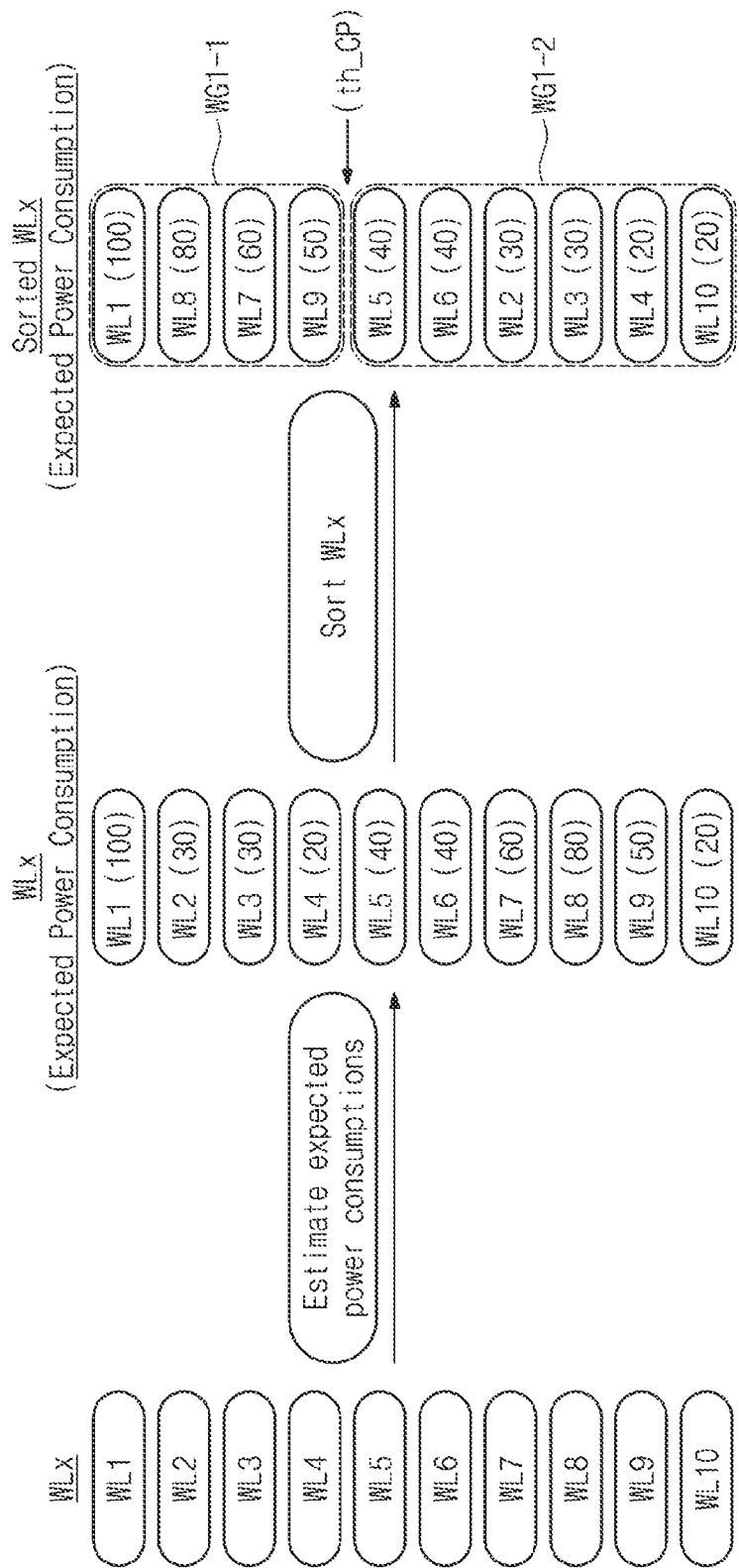
FIG. 13 is a diagram for describing the process of estimating expected power consumptions of one or more workloads, the process of classifying the one or more workloads into workload groups, and the process of determining a first workload, which are described with reference to FIG. 12.

FIG. 13 is a diagram for describing the process of estimating expected power consumptions of one or more workloads, the process of classifying the one or more workloads into workload groups, and the process of determining a first workload, which are described with reference to FIG. 12.

Referring to FIGS. 1 and 13, the processor 111 may sort one or more workloads WL1, WL2, WL3, WL4, WL5, WL6, WL7, WL8, WL9, and WL10 based on expected power consumptions.

In an embodiment, the expected power consumptions may respectively correspond to the one or more workloads WL1 to WL10.

In an embodiment, the processor 111 may estimate the expected power consumptions based on types of requests included in each of the one or more workloads, ranges of addresses included therein, or sizes of data included therein. For example, as requests included in one workload include more erase requests or more program requests, as ranges of addresses included in the one workload become greater, or as sizes of data included in the one workload become larger, the expected power consumption of the one workload may be estimated as a greater value.

In an embodiment, the one or more workloads may be transmitted from external electronic devices, and the processor 111 may estimate the expected power consumptions based on past histories of previous workloads transmitted by external electronic devices. For example, as actual power consumptions of previous workloads transmitted by a specific external electronic device become greater than actual power consumptions of previous workloads transmitted by another external electronic device, the expected power consumption of one workload transmitted by the specific external electronic device may be estimated as a greater value.

Referring to FIG. 13, the processor 111 may estimate that expected power consumptions of the one or more workloads WL1 to WL10 are 100, 30, 30, 20, 40, 40, 60, 80, 50, 20, respectively, and may sort the one or more workloads WL1 to WL10 based on the estimated expected power consumptions.

In an embodiment, the processor 111 may dynamically set a threshold power consumption based on the estimated expected power consumptions and may classify the one or more workloads WL1 to WL10 into groups WG1-1 and WG1-2 based on the threshold power consumption.

In an embodiment, based on the estimated expected power consumptions, the processor 111 may set, as the threshold power consumption, a power consumption (e.g., th_CP) between the highest expected power consumption (e.g., 100) and the lowest expected power consumption (e.g., 20) among the expected power consumptions that the one or more workloads WL1 to WL10 indicate. The processor 111 may classify workloads (e.g., WL1, WL8, WL7, and WL9) having a higher power consumption than the threshold power consumption as the workload group WG1-1 and may classify workloads (e.g., WL5, WL6, WL2, WL3, WL4, and WL10) having a lower power consumption than the threshold power consumption as the workload group WG1-2.

Referring to the above manner where storage devices are classified into storage groups as described with reference to FIG. 9, the processor 111 may in advance, set one or more threshold power consumptions and may classify the one or more workloads WL1 to WL10 into workload groups based on the one or more threshold power consumptions.

Figure 14:
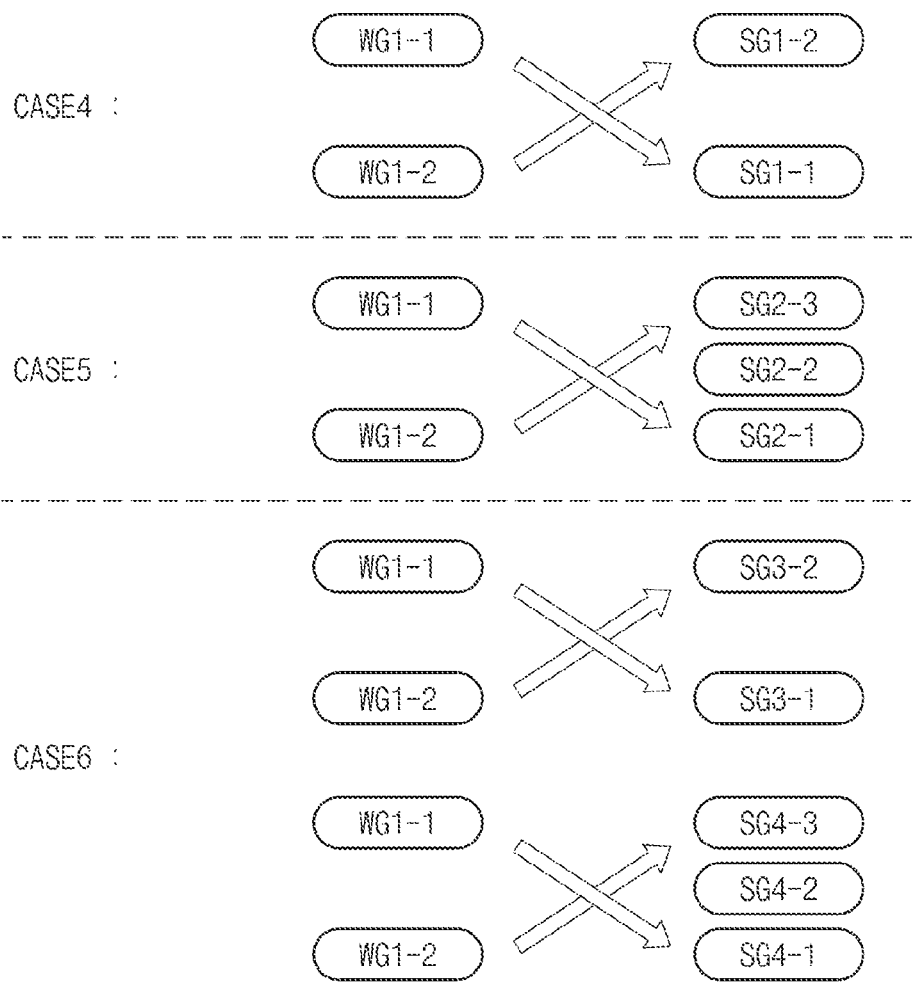
FIG. 14 is a diagram for describing processes of determining a first workload, a second workload, a first storage device, and a second storage device based on storage groups of FIGS. 8 and 9 and workload groups of FIG. 13.

FIG. 14 is a diagram for describing processes of determining a first workload, a second workload, a first storage device, and a second storage device based on storage groups of FIGS. 8 and 9 and workload groups of FIG. 13.

Referring to FIG. 14, a first workload, a second workload, a first storage device, and a second storage device may be determined based on the storage groups SG1-1, SG1-2, SG2-1, SG2-2, SG2-3, SG3-1, SG3-2, SG4-1, SG4-2, and SG4-3 of FIGS. 8 and 9 and the workload groups WG1-1 and WG1-2 of FIG. 13.

In CASE4, the workload group WG1-1 including workloads having a relatively high power consumption may be selected from the workload groups WG1-1 and WG1-2, and the storage group SG1-1 including storage devices having a relatively low internal temperature may be selected from the storage groups SG1-1 and SG1-2.

In an embodiment, any one of the workloads included in the workload group WG1-1 may be determined as the first workload, and any one of the storage devices included in the storage group SG1-1 may be determined as the first storage device. However, the present disclosure is not limited thereto. In an embodiment, as in the above description given with reference to FIG. 10, another storage device among the storage devices included in the storage group SG1-1 may be selected as the first storage device by using any other hardware characteristics together with an internal temperature.

In an embodiment, any one of the workloads included in the workload group WG1-2 may be determined as the second workload, and any one of the storage devices included in the storage group SG1-2 may be determined as the second storage device. However, the present disclosure is not limited thereto. In an embodiment, as in the above description given with reference to FIG. 10, another storage device among the storage devices included in the storage group SG1-2 may be selected as the second storage device by using any other hardware characteristics together with an internal temperature.

As in CASE4, first and second workloads and first and second storage devices may be selected in CASE5 and CASE6.

The selection of one workload group among workload groups may be independent of the selection of one storage group among storage groups. The selection of one workload among workloads included in one workload group may also be independent of the selection of one storage device among storage devices included in one storage group. Various manners described in the specification may be independently used in each of the selection of one workload group, the selection of one storage group, the selection of one workload, and the selection of one storage device.

Figure 15:
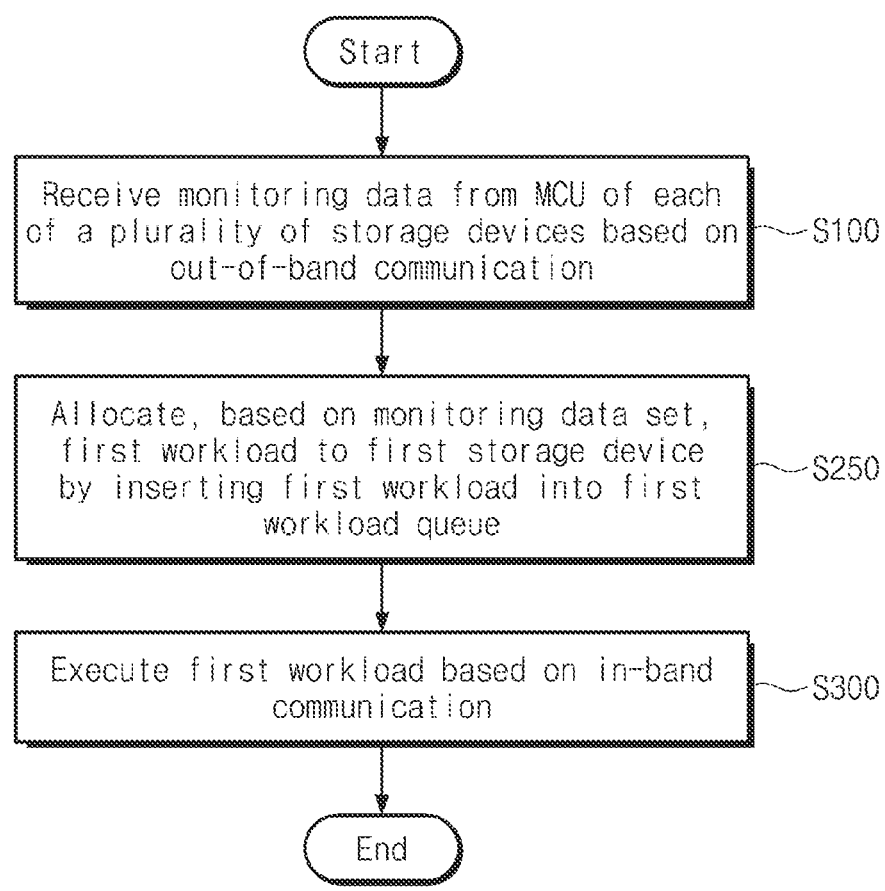
FIG. 15 is a flowchart illustrating an operating method of an electronic device according to an embodiment of the present disclosure.

FIG. 15 is a flowchart illustrating an operating method of an electronic device according to an embodiment of the present disclosure.

Compared to operation S200 of FIG. 3, referring to FIG. 15, in an operating method of an electronic device of FIG. 15, a processor of a host device may insert a first workload into a first workload queue and may allocate the first workload to a first storage device.

Referring to FIGS. 1 and 15, in the operating method of the electronic device 100 according to an embodiment of the present disclosure, the electronic device 100 may include the host device 110 and the plurality of storage devices 130, 150, and 170. The host device 110 may include the processor 111, the BMC 113, and the one or more workload queues 115. The plurality of storage devices 130, 150, and 170 may include the storage controllers 131, 151, and 171 and the MCUs 133, 153, and 173.

The MCU (each of 133, 153, and 173) of the plurality of storage devices 130, 150, and 170 may transmit monitoring data to the BMC 113, based on the out-of-band communication between the BMC 113 and the MCUs 133, 153, and 173 (S100).

Based on a monitoring data set including the monitoring data, the processor 111 may insert a first workload among one or more workloads into a first workload queue among the one or more workload queues 115 and may allocate the first workload to a first storage device (e.g., one of 130, 150, and 170) among the plurality of storage devices 130, 150, and 170 (S250). The monitoring data set may refer to data that are obtained by integrating pieces of monitoring data respectively transmitted from the MCUs 133, 153, and 173.

The first storage device may execute the first workload, based on the in-band communication between the processor 111 and a storage controller (e.g., a storage controller included in the first storage device) (S300).

Figure 16:
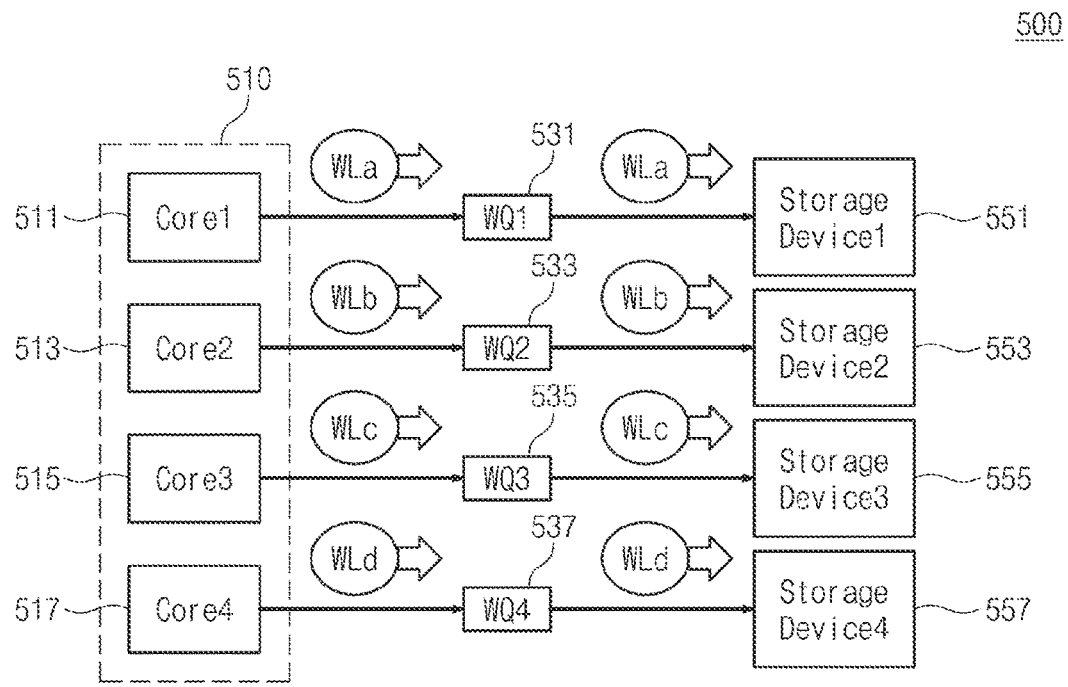
FIGS. 16 and 17 are diagrams for describing an embodiment of one or more workload queues of FIG. 15.
Figure 17:
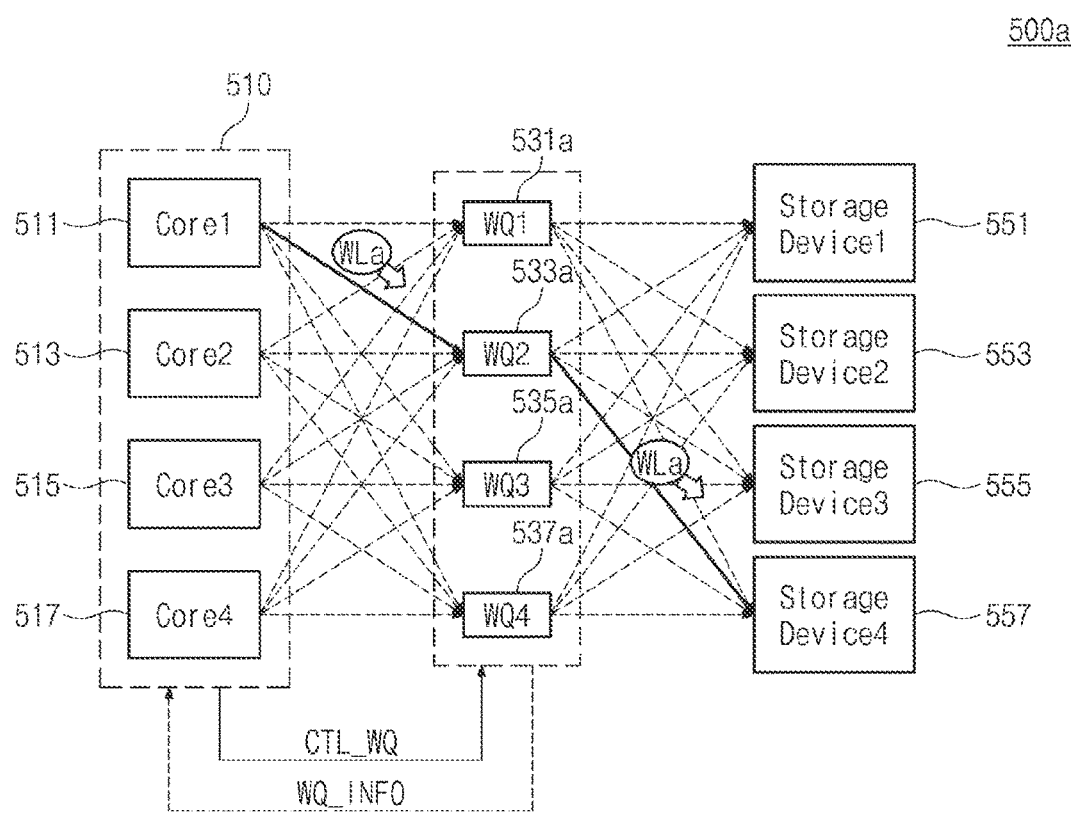
Figure 18:
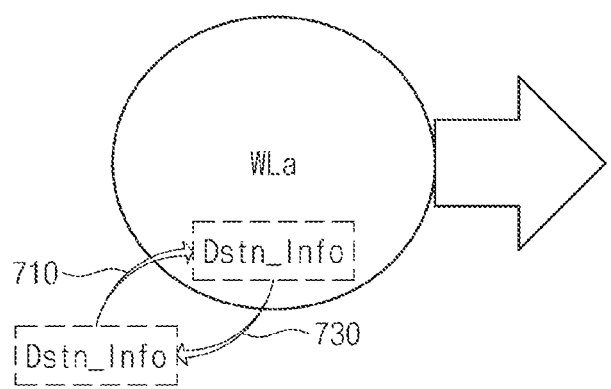
FIG. 18 is a diagram for describing an embodiment of a workload of FIG. 17.

FIGS. 16 and 17 are diagrams for describing an embodiment of workload queues of FIG. 15. FIG. 18 is a diagram for describing an embodiment of a workload of FIG. 17.

A processor 510, one or more workload queues 531, 533, 535, and 537, and storage devices 551, 553, 555, and 557 are illustrated in FIG. 16, and the processor 510, one or more workload queues 531a, 533a, 535a, and 537a, and the storage devices 551, 553, 555, and 557 are illustrated in FIG. 17.

The processor 510 and the storage devices 551, 553, 555, and 557 may respectively correspond to the processor 111 and the storage devices 130, 150, and 170 of FIG. 1, and the one or more workload queues 531, 533, 535, and 537 and the one or more workload queues 531a, 533a, 535a, and 537a may correspond to the workload queues 115.

Referring to FIG. 16, a host device may include the processor 510 and the one or more workload queues 531, 533, 535, and 537, and the processor 510 may include one or more cores 511, 513, 515, and 517.

In an embodiment, the one or more workload queues 531, 533, 535, and 537 may be generated to correspond to the one or more cores 511, 513, 515, and 517, respectively, and the number of one or more workload queues 531, 533, 535, and 537 may be equal to the number of one or more cores 511, 513, 515, and 517.

The one or more workload queues 531, 533, 535, and 537 may be respectively dedicated for the storage devices 551, 553, 555, and 557.

In an embodiment, the storage devices 551, 553, 555, and 557 may respectively correspond to the one or more workload queues 531, 533, 535, and 537, and the number of one or more workload queues 531, 533, 535, and 537 may be equal to the number of storage devices 551, 553, 555, and 557.

The processor 510 may insert a first workload into a first workload queue and may allocate the first workload to a first storage device. For example, the core 511 may insert the workload WLa into the workload queue 531 to allocate the workload WLa to the storage device 551, and the core 513 may insert the workload WLb into the workload queue 533 to allocate the workload WLb to the storage device 553. The core 515 may insert the workload WLc into the workload queue 535 to allocate the workload WLc to the storage device 555, and the core 517 may insert the workload WLd into the workload queue 537 to allocate the workload WLd to the storage device 557.

When an internal temperature of a relevant storage device exceeds a performance limitation temperature or is close to the performance limitation temperature, the MCU of each of the storage devices 551, 553, 555, and 557 may transmit monitoring data including a warning signal to a BMC of the host device. In this case, the processor 510 may delete the first workload from the first workload queue.

An example in which storage devices respectively correspond to one or more workload queues is illustrated in FIG. 16. However, in an embodiment, storage devices may not respectively correspond to one or more workload queues, and the number of the storage devices may be more than the number of the one or more workload queues 531, 533, 535, and 537. In this case, the processor 510 may classify storage devices into one or more storage groups, and the number of the storage groups may be equal to the number of the one or more workload queues 531, 533, 535, and 537.

In an embodiment, the processor 510 may sort the one or more workload queues 531, 533, 535, and 537 in the order of workload size, based on one or more of an access frequency and a priority for each workload queue. For example, with regard to the one or more workload queues 531, 533, 535, and 537, as the number of times of insertion and deletion of a workload by the processor 510 increases, the access frequency may increase. For example, the one or more workload queues 531, 533, 535, and 537 may respectively correspond to external electronic devices transmitting the one or more workloads, and a priority of each of the workload queues 531, 533, 535, and 537 may be determined based on past histories of previous workloads transmitted by the external electronic devices. As actual power consumptions of previous workloads transmitted by a specific external electronic device increase, a priority of a workload queue corresponding to the specific external electronic device may increase. In this case, the processor 510 may determine a workload queue having the highest priority from among the one or more workload queues 531, 533, 535, and 537 as the first workload queue.

Referring to FIG. 17, a host device may include the processor 510 and the one or more workload queues 531*a*, 533*a*, 535*a*, and 537*a*, and the processor 510 may include the one or more cores 511, 513, 515, and 517.

In an embodiment, the one or more workload queues 531*a*, 533*a*, 535*a*, and 537*a* may be generated to correspond to the one or more cores 511, 513, 515, and 517, respectively, and the number of one or more workload queues 531*a*, 533*a*, 535*a*, and 537*a* may be equal to the number of one or more cores 511, 513, 515, and 517.

In an embodiment, the one or more workload queues 531*a*, 533*a*, 535*a*, and 537*a* are not dedicated for the storage devices 551, 553, 555, and 557.

In an embodiment, the storage devices 551, 553, 555, and 557 may be allocated regardless of the one or more workload queues 531*a*, 533*a*, 535*a*, and 537*a*, and the number of one or more workload queues 531*a*, 533*a*, 535*a*, and 537*a* may be different from the number of storage devices 551, 553, 555, and 557 (unlike the embodiment illustrated in FIG. 16).

In this case, the processor 510 may add first destination information indicating a first storage device to a first workload and may allocate the first workload to the first storage device. For example, referring to FIG. 18, the core 511 may insert the workload WLa into the workload queue 533*a* and may add destination information Dstn_info indicating the storage device 557 to the workload WLa (e.g., refer to 710 in FIG. 18) such that the workload WLa is allocated to the storage device 557. The core 511 may delete the destination information Dstn_Info from the workload WLa (e.g., refer to 730 in FIG. 18) such that the allocation of the workload WLa to the storage device 557 is cancelled.

The one or more workload queues 531*a*, 533*a*, 535*a*, and 537*a* may receive a control signal CTL_WQ from the processor 510 and may transmit workload queue information WQ_INFO including the destination information to the processor 510. Based on the control signal CTL_WQ, the one or more workload queues 531*a*, 533*a*, 535*a*, and 537*a* may add the first destination information to the first workload or may delete the first destination information from the first workload. Based on the workload queue information WQ_INFO, the processor 510 may manage the one or more workload queues 531*a*, 533*a*, 535*a*, and 537*a*.

Figure 19:
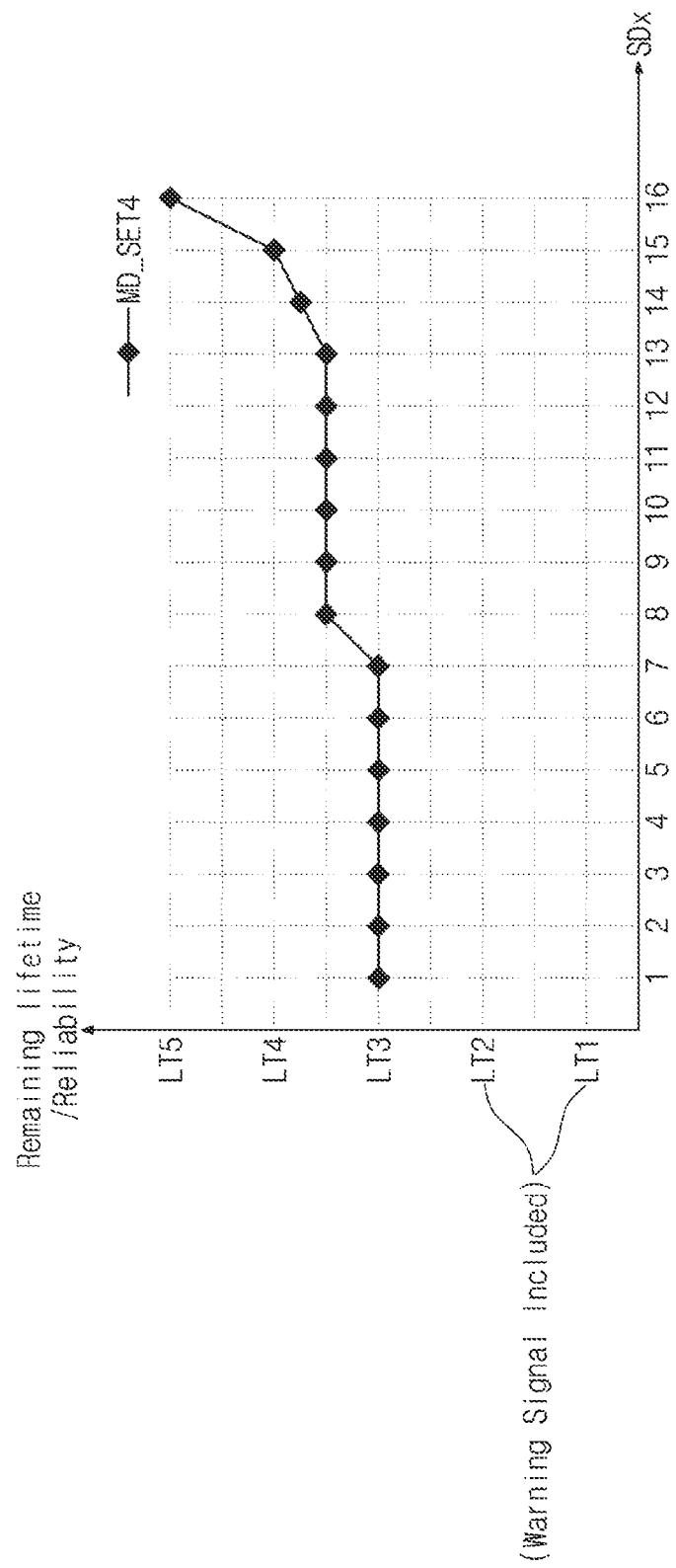
FIG. 19 is a diagram for describing an example of the process of determining a first storage device based on a monitoring data set.

FIG. 19 is a diagram for describing an example of the process of determining a first storage device based on a monitoring data set.

A monitoring data set MD_SET4 including pieces of monitoring data is illustrated in FIG. 19.

In FIG. 19, the y-axis represents a remaining lifetime/reliability (e.g., as indicated by LT1, LT2, LT3, LT4, and LT5) and the x-axis represents storage devices SD1, SD2, SD3, SD4, SD5, SD6, SD7, SD8, SD9, SD10, SD11, SD12, SD13, SD14, SD15, and SD16 (e.g., SDx corresponds to these storage devices).

The monitoring data set MD_SET4 may include all of the pieces of monitoring data transmitted from the storage devices SD1, SD2, SD3, SD4, SD5, SD6, SD7, SD8, SD9, SD10, SD11, SD12, SD13, SD14, SD15, and SD16 and may indicate remaining lifetimes/reliabilities of the storage devices SD1 to SD16.

In an embodiment, the monitoring data set MD_SET4 may be generated by a BMC of a host device.

Referring to FIG. 19, each of the pieces of monitoring data may include hardware characteristics associated with a relevant storage device and may further include a warning signal. For example, the hardware characteristics may include a program/erase (P/E) cycle, an Un-correctable Error Correction Code (UECC) count, and a Correctable Error Correction Code (CECC) count of the relevant storage device, and the BMC of the host device may identify the remaining lifetimes/reliabilities of the storage devices SD1 to SD16 based on the program/erase (P/E) cycle, the UECC count, and the CECC count. For example, the warning signal may be generated by the MCU included in each of the storage devices SD1 to SD16 when one or more of the hardware characteristics exceed a relevant performance limitation value or are close to the performance limitation value. The performance limitation value (e.g., the number of times of performance limitation) associated with the program/erase cycle from among the hardware characteristics may be determined based on a theoretical lifetime of a storage device, and the performance limitation values associated with the UECC count and the CECC count may be determined based on a minimum performance of an ECC block.

In an embodiment, the processor of the host device may determine a storage device having the highest remaining lifetime from among the plurality of storage devices as the first storage device by using the monitoring data set MD_SET4.

In an embodiment, the processor of the host device may further determine a second workload among the one or more workloads, may further determine a second storage device among the plurality of storage devices, and may allocate the second workload to the second storage device. For example, based on a result of sorting workloads in the order of power consumption, the processor may determine a workload having the lowest power consumption from among the one or more workloads as the first workload and may determine a workload having the highest power consumption from among the one or more workloads as the second workload. The processor may determine a storage device having the highest remaining lifetime from among the plurality of storage devices as the first storage device and may determine a storage device having the lowest remaining lifetime from among the plurality of storage devices as the second storage device.

As described with reference to FIGS. 8 and 9, the processor of the host device may dynamically set a threshold remaining lifetime/reliability based on the monitoring data set MD_SET4 and may classify storage devices into storage groups based on the threshold remaining lifetime/reliability. The processor of the host device may in advance, set one or more threshold remaining lifetimes/reliabilities regardless of the monitoring data set MD_SET4 and may classify storage devices into storage groups based on the threshold remaining lifetimes/reliabilities.

As described with reference to FIG. 10, the processor of the host device may determine the first storage device for allocating an arbitrary workload based on the storage groups.

Figure 20:
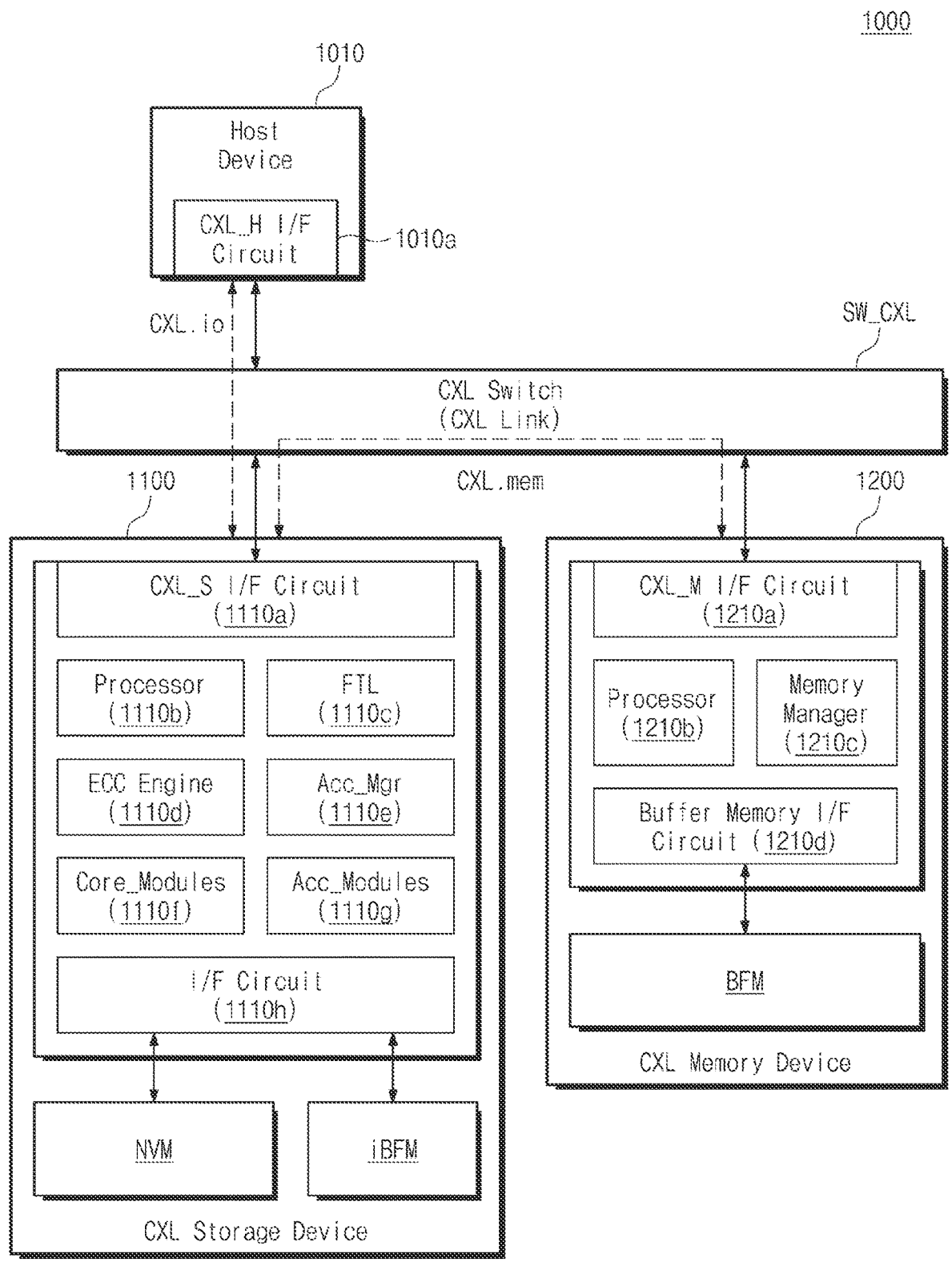
FIG. 20 is a block diagram illustrating an electronic system including an electronic device according to embodiments of the present disclosure.

FIG. 20 is a block diagram illustrating an electronic system including an electronic device according to embodiments of the present disclosure.

Referring to FIG. 20, an electronic system 1000 may include a host device 1010, a compute express link (CXL) storage device 1100, and a CXL memory device 1200 that communicate through a CXL switch SW_CXL. The host device 1010 and the CXL storage device 1100 may respectively correspond to the host device 110 and the storage device 130 of FIG. 1.

The CXL switch SW_CXL may be a component included in a CXL interface. For example, the CXL interface may perform functions of a host interface, a buffer memory interface, and a non-volatile memory interface.

The host device 1010 may include a CXL host interface circuit 1010a. The CXL host interface circuit 1010a may include workload queues (e.g., 115 of FIG. 1 or 115a of FIG. 2). The CXL host interface circuit 1010a may communicate with the CXL storage device 1100 or the CXL memory device 1200 through the CXL switch SW_CXL.

The CXL storage device 1100 may include a CXL storage interface circuit 1110a, a processor 1110b, an FTL 1110c, an ECC engine 1110d, an acceleration module manager 1110e, a core module(s) 1110f, an acceleration module(s) 1110g, a non-volatile memory interface circuit 1110h, a non-volatile memory NVM, and an internal buffer memory iBFM.

The components 1110a, 1110b, 1110c, 1110d, 1110e, 1110f, 1110g, and 1110h included in the CXL storage device 1100 may constitute a "CXL storage controller", and the CXL storage controller may correspond to a storage controller (e.g., each of 131, 151, and 171 of FIG. 1).

In an embodiment, under control of the host device 1010, the CXL storage controller may store data in the non-volatile memory NVM or may transmit data present in the non-volatile memory NVM to the host device 1010. For example, the non-volatile memory NVM may be a NAND flash memory, but the present disclosure is not limited thereto.

In an embodiment, the internal buffer memory iBFM may temporarily store data that are input to the CXL storage controller or are output from the CXL storage controller.

The CXL memory device 1200 may include a CXL memory interface circuit 1210a, a processor 1210b, a memory manager 1210c, a buffer memory interface circuit 1210d, and a buffer memory BFM. The components 1210a, 1210b, 1210c, and 1210d included in the CXL memory device 1200 may constitute a "CXL memory controller", and the CXL memory controller may correspond to an MCU (e.g., each of 133, 153, and 173 of FIG. 1).

In an embodiment, under control of the host device 1010, the CXL memory device 1200 may store data in the buffer memory BFM or may send data stored in the buffer memory BFM to the host device 1010. For example, the CXL memory device 1200 may store monitoring data associated with the CXL storage device 1100 in the buffer memory BFM and may transmit the monitoring data to the host device 1010 periodically or non-periodically. For example, the buffer memory BFM may be a DRAM, but the present disclosure is not limited thereto.

In an embodiment, the host device 1010, the CXL storage device 1100, and the CXL memory device 1200 may be configured to share the same interface. For example, the host device 1010, the CXL storage device 1100, and the CXL memory device 1200 may communicate with each other through the CXL switch SW_CXL. The CXL switch SW_CXL may refer to a low-latency and high-bandwidth link that supports coherency, memory access, and dynamic protocol muxing of IO protocols such that various connections between accelerators, memory devices, or various electronic devices may be implemented.

Figure 21:
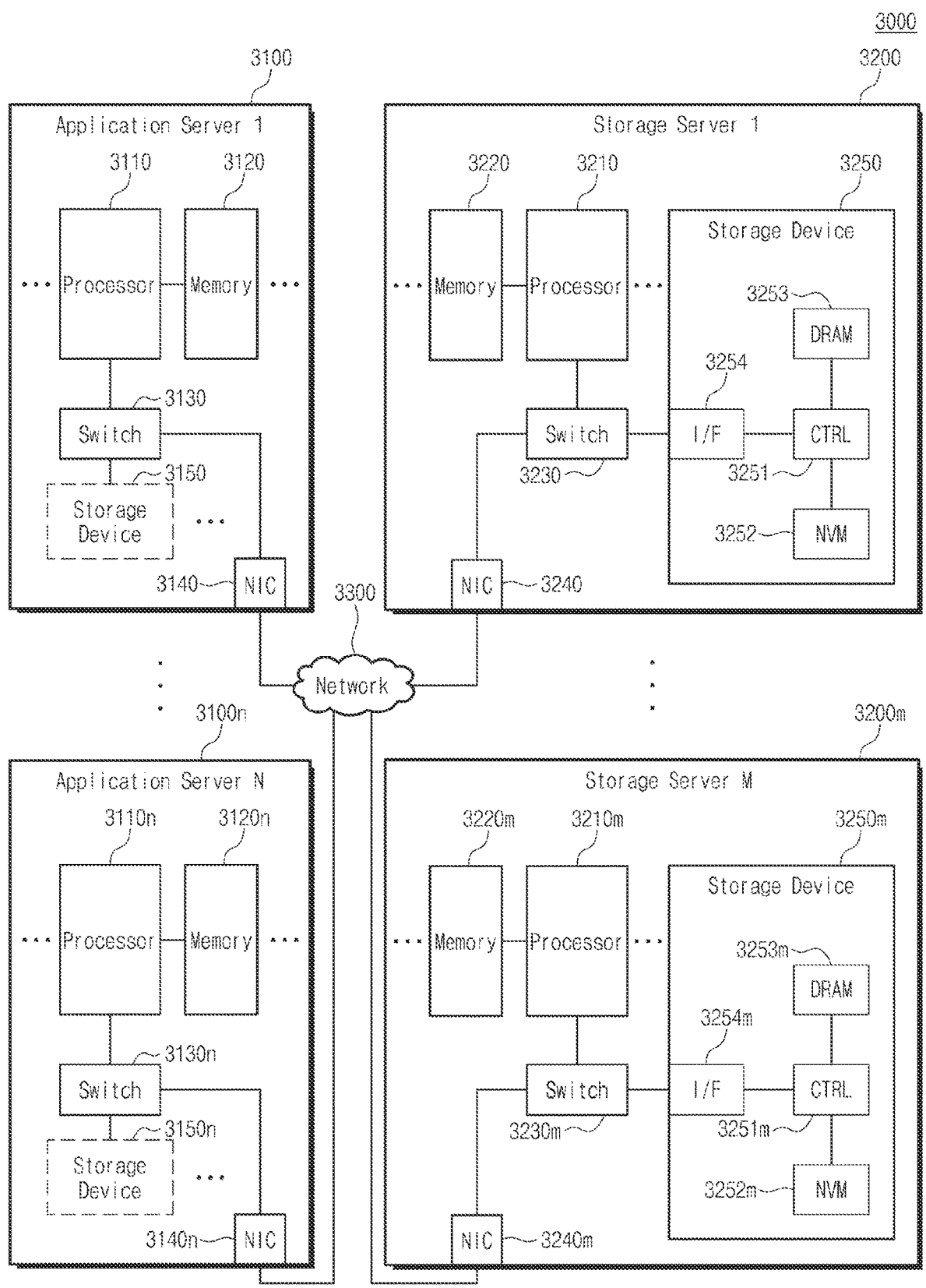
FIG. 21 is a diagram illustrating a data center including an electronic device according to an embodiment of the present disclosure.

FIG. 21 is a diagram illustrating an electronic device including an electronic device according to an embodiment of the present disclosure.

Referring to FIG. 21, the data center 3000 may be a facility that collects various types of pieces of data and provides services, and may be referred to as a data storage center. The data center 3000 may be, for example, a system for operating a search engine and a database, and may be a computing system used by companies, such as, for example, banks, or government agencies. The data center 3000 may include application servers 3100 to 3100n and storage servers 3200 to 3200m, where n and m are positive integers. The number of application servers 3100 to 3100n and the number of storage servers 3200 to 3200m may be variously selected according to embodiments. The number of application servers 3100 to 3100n may be different from the number of storage servers 3200 to 3200m according to embodiments.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be, for example, a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may 3210 may include a single-core processor or a multi-core processor. The above description of the storage server 3200 may be similarly applied to the application server 3100. In some embodiments, the application server 3100 does not include a storage device 3150. The storage server 3200 may 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using, for example, a fiber channel (FC) or Ethernet. In this case, the FC may be a medium used for relatively high-speed data transmission and may use an optical switch with high performance and high availability. The storage servers 3200 to 3200m may be provided as, for example, file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As an example, the SAN may be an Internet protocol (IP)-SAN, which uses a transmission control protocol (TCP)/IP network and is implemented according to a SCSI over TCP/IP or Internet SCSI (iSCSI) protocol. In an embodiment, the network 3300 may be a general network, such as a TCP/IP network. For example, the network 3300 may be implemented according to a protocol, such as, for example, FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The application servers 3100 to 3100*n* may further include a switch 3130 to 3130*n* and a network interface card (NIC) 3140 to 3140*n*. The switch 3130 to 3130*n* may selectively connect the processor 3110 to 3110*n* to the storage device 3150 to 3150*n* or selectively connect the NIC 3140 to 3140*n* to the storage device 3150 to 3150*n* via the control of the processor 3110 to 3110*n*.

The storage servers 3200 to 3200*m* will now be described as an example. An interface 3254 to 3254*m* may provide a physical connection between a processor 3210 to 3210*m* and a controller 3251 to 3251*m* and a physical connection between a network interface card (NIC) 3240 to 3240*m* and the controller 3251 to 3251*m*. For example, the interface 3254 to 3254*m* may be implemented using a direct attached storage (DAS) scheme in which the storage device 3250 to 3250*m* is directly connected with a dedicated cable. For example, the interface 3254 to 3254*m* may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage servers 3200 to 3200*m* may further include a switch 3230 to 3230*m* and a network interface card (NIC) 3240 to 3240*m*. The switch 3230 to 3230*m* may selectively connect the processor 3210 to 3210*m* to the storage device 3250 to 3250*m* or selectively connect the NIC 3240 to 3240*m* to the storage device 3250 to 3250*m* via the control of the processor 3210 to 3210*m*.

In an embodiment, the NIC 3240 may include a network interface card and a network adaptor. The NIC 3240 may be connected to the network 3300 by, for example, a wired interface, a wireless interface, a BLUETOOTH interface, or an optical interface. The NIC 3240 may include, for example, an internal memory, a digital signal processor (DSP), and a host bus interface, and may be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 to 3253*m* may temporarily store (or buffer) data to be written to the NAND flash memory device 3252 to 3252*m* or data read from the NAND flash memory device 3252 to 3252*m*. Also, the DRAM 3253 to 3253*m* may store metadata. Here, the metadata may be user data or data generated by the controller 3251 to 3251*m* to manage the NAND flash memory device 3252 to 3252*m*. The storage device 3250 to 3250*m* may include a secure element (SE) for security or privacy.

For example, the application processor 3100 or the processor 3210 of the storage server 3200 may correspond to the host device 110 of FIG. 1, and the storage device 3250 of the storage server 3200 may correspond to one of the storage devices 130, 150, and 170 of FIG. 1. However, the present disclosure is not limited thereto.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As described above, an electronic device according to an embodiment of the present disclosure may efficiently allocate one or more workloads to each of a plurality of storage devices based on monitoring data received from each of the plurality of storage devices.

The electronic device may include workload queues, and may control the "allocation of workloads" by inserting or deleting one or more workloads from the workload queues. The electronic device may control the "allocation of workloads" by adding or deleting destination information indicating a specific storage device to each of the one or more workloads.

The "allocation of workloads" and the "reception of monitoring data" may be performed independently of each other, based on the in-band communication and the out-of-band communication.

The storage devices may provide the dynamic thermal throttling-based protection mode, which may protect the storage devices from a high internal temperature, and the electronic device may efficiently allocate one or more workloads to the storage devices such that entering the protection mode is blocked or delayed.

When the internal temperature of the storage device increases to a given level or more due to the heat coming from the internal operations of the storage device, the storage device may provide a protection mode referred to as a "dynamic thermal throttling operation", which may protect elements of the storage device. An operation in which the storage device enters the protection mode may act as a factor reducing the performance of the storage device. The electronic device may block or delay entering the protection mode by efficiently allocating workloads, which the storage devices will execute, to the storage devices based on the monitoring data.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
   a host device including a processor and a baseboard management controller (BMC); and
   a plurality of storage devices, each including a storage controller and a micro controller unit (MCU),
   wherein the processor and the storage controller are configured to support an in-band communication, and the BMC and the MCU are configured to support an out-of-band communication,
   wherein the BMC is configured to receive monitoring data from the MCU of each of the plurality of storage devices based on the out-of-band communication,
   wherein the processor is further configured to allocate a first workload among one or more workloads to a first storage device among the plurality of storage devices, based on a monitoring data set including the monitoring data, and
   wherein the first storage device is configured to execute the first workload based on the in-band communication.

2. The electronic device of claim 1, wherein the MCU is further configured to periodically transmit the monitoring data, and the monitoring data indicates an internal temperature of the corresponding storage device to the BMC.

3. The electronic device of claim 2, wherein the processor is further configured to determine a storage device having a lowest internal temperature from among the plurality of storage devices as the first storage device, by using the monitoring data set.

4. The electronic device of claim 2, wherein the monitoring data received by the BMC from the MCU includes a warning signal when the internal temperature exceeds or is close to a performance limitation temperature.

5. The electronic device of claim 4, wherein the processor is further configured not to allocate the first workload to a storage device corresponding to the warning signal from among the plurality of storage devices by using the monitoring data set.

6. The electronic device of claim 4, wherein the processor is further configured to allocate the first workload to the first storage device based on the monitoring data set and the one or more workloads.

7. The electronic device of claim 6, wherein the processor is further configured to sort the one or more workloads based on a power consumption of each of the one or more workloads.

8. The electronic device of claim 7, wherein the processor is further configured to:
   determine a workload having a lowest power consumption from among the one or more workloads as the first workload, based on a result of the sorting; and
   determine a storage device corresponding to the warning signal from among the plurality of storage devices as the first storage device by using the monitoring data set.

9. The electronic device of claim 2, wherein the processor is further configured to:
   allocate a second workload among the one or more workloads to a second storage device among the plurality of storage devices;
   determine a storage device having a lower internal temperature than a threshold temperature from among the plurality of storage devices as the first storage device and a storage device having a higher internal temperature than the threshold temperature from among the plurality of storage devices as the second storage device, by using the monitoring data set;
   sort the one or more workloads based on a power consumption of each of the one or more workloads; and
   determine a workload having a higher power consumption than a threshold power consumption from among the one or more workloads as the first workload and a workload having a lower power consumption than the threshold power consumption from among the one or more workloads as the second workload, by using a result of the sorting.

10. The electronic device of claim 1, wherein the host device further includes one or more workload queues configured to store the one or more workloads.

11. The electronic device of claim 10, wherein a first workload queue among the one or more workload queues is dedicated for the first storage device, and
   wherein the processor is further configured to insert the first workload into the first workload queue, and to allocate the first workload to the first storage device.

12. The electronic device of claim 11, wherein the monitoring data received by the BMC from the MCU includes a warning signal when an internal temperature of a corresponding storage device exceeds or is close to a performance limitation temperature; and wherein, when the first storage device is configured to transmit the monitoring data including the warning signal to the BMC, the processor deletes the first workload from the first workload queue.

13. The electronic device of claim 10, wherein the processor is further configured to add first destination information indicating the first storage device to the first workload, and to transmit the first workload to the first storage device.

14. The electronic device of claim 13, wherein, when an internal temperature of a corresponding storage device exceeds or is close to a performance limitation temperature, the monitoring data received by the BMC from the MCU includes a warning signal; and wherein, when the first storage device transmits the monitoring data including the warning signal to the BMC, the processor is further configured to delete the first destination information from the first workload.

15. An electronic device, comprising:

a host device including a processor, a baseboard management controller (BMC), and one or more workload queues; and a plurality of storage devices, each of which includes a storage controller and a micro controller unit (MCU), wherein the BMC is configured to receive monitoring data from the MCU of each of the plurality of storage devices based on an out-of-band communication between the BMC and the MCU, wherein, based on a monitoring data set including the monitoring data, the processor is configured to insert a first workload among one or more workloads to a first workload queue among the one or more workload queues such that the first workload is allocated to a first storage device among the plurality of storage devices, and wherein the first storage device is configured to execute the first workload based on an in-band communication between the processor and the storage controller.

16. The electronic device of claim 15, wherein the MCU is configured to periodically transmit the monitoring data to the BMC, and the monitoring data indicates one or more of a program/erase (P/E) cycle, an uncorrectable error correction code (UECC) count, and a correctable error correction code (CECC) count.

17. The electronic device of claim 16, wherein the processor is further configured to determine a storage device having a highest remaining lifetime from among the plurality of storage devices as the first storage device, by using the monitoring data set.

18. The electronic device of claim 17, wherein the processor is further configured to sort the one or more workload queues in an order of workload size, based on an access frequency and a priority.

19. The electronic device of claim 18, wherein the processor is further configured to determine a workload queue having a highest priority from among the one or more workload queues as the first workload queue.

20. An operation method of an electronic device which includes a host device including a processor, a baseboard management controller (BMC), and one or more workload queues, and a plurality of storage devices each including a storage controller and a micro controller unit (MCU), the method comprising:

transmitting monitoring data from the MCU of each of the plurality of storage devices to the BMC, based on an out-of-band communication between the BMC and the MCU;

inserting, by the processor, a first workload among one or more workloads into a first workload queue among the one or more workload queues based on a monitoring data set including the monitoring data, such that the first workload is allocated to a first storage device among the plurality of storage devices; and executing, by the first storage device, the first workload based on an in-band communication between the processor and the storage controller.

\* \* \* \* \*